US008204232B2

(12) United States Patent
Struik et al.

(10) Patent No.: US 8,204,232 B2
(45) Date of Patent: Jun. 19, 2012

(54) ACCELERATED VERIFICATION OF DIGITAL SIGNATURES AND PUBLIC KEYS

(75) Inventors: Marinus Struik, Toronto (CA); Daniel R. Brown, Mississauga (CA); Scott A. Vanstone, Campbellville (CA); Robert P. Gallant, Corner Brook (CA); Adrian Antipa, Brampton (CA); Robert J. Lambert, Cambridge (CA)

(73) Assignee: Certicom Corp., Mississauga, ON (CA)

( * ) Notice: Subject to any disclaimer, the term of this patent is extended or adjusted under 35 U.S.C. 154(b) by 1309 days.

(21) Appl. No.: 11/333,296

(22) Filed: Jan. 18, 2006

(65) Prior Publication Data

US 2007/0064932 A1 Mar. 22, 2007

Related U.S. Application Data

(60) Provisional application No. 60/644,034, filed on Jan. 18, 2005.

(51) Int. Cl.
*H04L 9/08* (2006.01)

(52) U.S. Cl. ............ 380/282; 380/277; 380/30; 380/28; 713/171; 713/172; 713/168; 713/169

(58) Field of Classification Search .................. 713/176, 713/168, 180; 283/13; 382/276, 308; 705/75; 380/283

See application file for complete search history.

(56) References Cited

U.S. PATENT DOCUMENTS

| 4,519,036 A | 5/1985 | Green |
| 4,745,568 A | 5/1988 | Onyszchuk et al. |
| 4,748,668 A | 5/1988 | Shamir et al. |
| 4,890,323 A | 12/1989 | Beker et al. |
| 4,989,171 A | 1/1991 | Hollmann |
| 5,146,500 A | 9/1992 | Maurer |
| 5,150,411 A | 9/1992 | Maurer |
| 5,159,632 A | 10/1992 | Crandall |
| 5,202,995 A | 4/1993 | O'Brien |
| 5,218,637 A | 6/1993 | Angebaud et al. |
| 5,271,061 A | 12/1993 | Crandall |
| 5,272,755 A | 12/1993 | Miyaji et al. |
| 5,351,297 A | 9/1994 | Miyaji et al. |
| 5,373,560 A | 12/1994 | Schlafly |

(Continued)

FOREIGN PATENT DOCUMENTS

EP 588339 A2 3/1994

(Continued)

OTHER PUBLICATIONS

Bleichenbacher, "Compressing Rabin Signatures", *Lecture Notes in Computer Science*, Springer, Berlin, 2004, pp. 124-126, ISBN 3-540-20996-4.

(Continued)

*Primary Examiner* — Pramila Parthasarathy
(74) *Attorney, Agent, or Firm* — Fish & Richardson P.C.

(57) ABSTRACT

Accelerated computation of combinations of group operations in a finite field is provided by arranging for at least one of the operands to have a relatively small bit length. In a elliptic curve group, verification that a value representative of a point R corresponds the sum of two other points uG and vG is obtained by deriving integers w,z of reduced bit length and so that v=w/z. The verification equality R=uG+vQ may then be computed as −zR+(uz mod n) G+wQ=O with z and w of reduced bit length. This is beneficial in digital signature verification where increased verification can be attained.

32 Claims, 14 Drawing Sheets

U.S. PATENT DOCUMENTS

| | | | |
|---|---|---|---|
| 5,442,707 A | 8/1995 | Miyaji et al. | |
| 5,463,690 A | 10/1995 | Crandall | |
| 5,497,423 A | 3/1996 | Miyaji | |
| 5,511,198 A | 4/1996 | Hotta | |
| 5,524,222 A | 6/1996 | Hervin | |
| 5,627,893 A | 5/1997 | Demytko | |
| 5,650,948 A | 7/1997 | Gafter | |
| 5,675,645 A | 10/1997 | Schwartz et al. | |
| 5,757,918 A | 5/1998 | Hopkins | |
| 5,761,305 A | 6/1998 | Vanstone et al. | |
| 5,764,772 A | 6/1998 | Kaufman et al. | |
| 5,768,389 A | 6/1998 | Ishii | |
| 5,778,069 A | 7/1998 | Thomlinson et al. | |
| 5,825,880 A | 10/1998 | Sudia et al. | |
| 5,889,865 A | 3/1999 | Vanstone et al. | |
| 5,892,899 A | 4/1999 | Aucsmith et al. | |
| 5,896,455 A | 4/1999 | Vanstone et al. | |
| 5,937,066 A | 8/1999 | Gennaro et al. | |
| 5,987,131 A | 11/1999 | Clapp | |
| 5,999,626 A | 12/1999 | Mullin et al. | |
| 6,122,736 A | 9/2000 | Vanstone et al. | |
| 6,141,420 A | 10/2000 | Vanstone et al. | |
| 6,212,279 B1 | 4/2001 | Reiter et al. | |
| 6,243,467 B1* | 6/2001 | Reiter et al. | 380/30 |
| 6,279,110 B1 | 8/2001 | Johnson et al. | |
| 6,298,135 B1 | 10/2001 | Messerges et al. | |
| 6,304,658 B1 | 10/2001 | Kocher et al. | |
| 6,334,189 B1 | 12/2001 | Granger et al. | |
| 6,411,715 B1 | 6/2002 | Liskov et al. | |
| 6,419,159 B1 | 7/2002 | Odinak | |
| 6,430,588 B1 | 8/2002 | Kobayashi et al. | |
| 6,446,207 B1 | 9/2002 | Vanstone et al. | |
| 6,496,929 B2 | 12/2002 | Lenstra | |
| 6,724,894 B1 | 4/2004 | Singer | |
| 6,816,594 B1 | 11/2004 | Okeya | |
| 6,829,356 B1* | 12/2004 | Ford | 380/44 |
| 6,873,706 B1 | 3/2005 | Miyazaki et al. | |
| 7,110,538 B2 | 9/2006 | Gallant et al. | |
| 7,127,063 B2 | 10/2006 | Lambert et al. | |
| 7,215,780 B2 | 5/2007 | Lambert et al. | |
| 7,421,074 B2 | 9/2008 | Jin et al. | |
| 7,486,789 B2* | 2/2009 | Futa et al. | 380/30 |
| 7,599,491 B2 | 10/2009 | Lambert | |
| 7,613,660 B2 | 11/2009 | Pintsov | |
| 2001/0053220 A1 | 12/2001 | Kocher et al. | |
| 2002/0044649 A1 | 4/2002 | Gallant et al. | |
| 2002/0057796 A1 | 5/2002 | Lambert et al. | |
| 2002/0166058 A1 | 11/2002 | Fueki | |
| 2003/0021410 A1* | 1/2003 | Miyazaki et al. | 380/30 |
| 2003/0044003 A1 | 3/2003 | Chari et al. | |
| 2003/0048903 A1 | 3/2003 | Ito et al. | |
| 2003/0059042 A1* | 3/2003 | Okeya et al. | 380/30 |
| 2003/0059043 A1 | 3/2003 | Okeya | |
| 2003/0061498 A1 | 3/2003 | Drexler et al. | |
| 2005/0135606 A1* | 6/2005 | Brown | 380/28 |

FOREIGN PATENT DOCUMENTS

| | | | |
|---|---|---|---|
| FR | 2536928 A1 | 6/1984 | |
| FR | 2672402 A1 | 8/1992 | |
| JP | 2002-328602 | 11/2002 | |
| JP | 2004-163687 | 6/2004 | |
| WO | W09116691 A1 | 10/1991 | |
| WO | W09800771 A1 | 1/1998 | |
| WO | W09852319 A1 | 11/1998 | |
| WO | WO0042733 A1 | 7/2000 | |

OTHER PUBLICATIONS

Website: http://cr.yp.to/sigs/compress.html. Publication date of website: unknown. Retrieved on Jul. 15, 2009.

Ciet, M. et al.; "Improved Algorithms for Efficient Arithmetic on Elliptic Curves Using Fast Endomorphisms"; May 4, 2003; pp. 388 to 400; LNCS 2656; Advances in Cryptology—Eurocypt; International Conference on the Theory and Application of Cyptographic Techniques; Springer-Verlag; Germany.

Sakai, Y. et al.; "Algorithms for Efficient Simultaneous Elliptic Scalar Multiplication with Reduced Joint Hamming Weight Representation of Scalars"; Sep. 30, 2002; pp. 484 to 499; LNCS 2433; Proceedings of the 5th International Conference on Information Security; Springer-Verlag; Germany.

Park, Y-H, et al.; "An Alternate Decomposition of an Integer for Faster Point Multiplication on Certain Elliptic Curves"; Jan. 1, 2002; pp. 323 to 334; LNCS 2274; Proceedings of the 5th International Workshop on Practice and Theory in Public Key Cryptosystems; Springer-Verlag; Germany.

Johnson, D. et al.; "The Elliptic Curve Digital Signature Algorithm (ECDSA)"; Aug. 1, 2001; pp. 36 to 53; International Journal of Information Security; vol. 1, No. 1; Published on-line Jul. 27, 2001.

Leendert, P.; Supplementary European Search Report from corresponding EP Application No. 06701572.7; completed Sep. 24, 2009; received by applicant's agent Oct. 6, 2009.

Deitel, H.M. et al., "C++ How to Program", 1994, Prentice-Hall, pp. 58-62.

Wang, C. et al.; "VLSI Architectures for Computing Multiplications and Inverses in GF (2m)"; IEEE Transactions on Computers; vol. C-34, No. 8; 1985; pp. 709-717.

Miyaji, A.; "Elliptic Curves Suitable for Cryptosystems"; IEICE Transactions on Fundamentals of Electronics, Communications and Computer Sciences; vol. E77-A, No. 1; 1994; pp. 98-104.

Schnorr, C.P.; "Efficient Signature Generation by Smart Cards"; Journal of Cryptology; vol. 4, No. 3; 1991; pp. 161-174.

Koyama, K. et al.; "Elliptic Curve Cryptosystems and Their Applications"; IEICE Transactions on Information and Systems; vol. E75-D, No. 1; 1992; pp. 50-57.

Waleffe, D. et al.; "CORSAIR: A Smart Card for Public Key Cryptosystems", Advances in Cryptology—CRYPTO '90; 1990; pp. 502-513.

Koblitz, Neal; "Elliptic Curve Cryptosystems"; Mathematics of Computation,; vol. 48, No. 177; 1987; pp. 203-209.

Menezes, Alfred; "Elliptic Curve Cryptosystems"; A thesis presented to the University of Waterloo; 1992; pp. 1-121.

Miller, Victor C.; "Use of Elliptic Curves in Cryptography"; CRYPTO '85; LNCS 218; 1985; pp. 417-426.

Menezes, A. et al.; "The Implementation of Elliptic Curve Cryptosystems" of "Lecture Notes in Computer Science"; Advances in Cryptology-AUSCRYPT '90; International Conference on Cryptology; vol. 453; 1990; 14 pages.

Lercier, R.; "Finding Good Random Elliptic Curves for Cryptosystems Defined over Finite Fields"; Advances in Cryptography—EUROPCRYPT '97; vol. 1233; 1997; pp. 379-392.

Menezes, Alfred. J.; "Handbook of Applied Cryptography"; CRC Press; 1997; pp. 613, 614, 618.

Mueller, Volker; "Fast Multiplication on Elliptic Curves over Small Fields of Characteristic Two"; Submitted to Journal of Cryptology; 1997; pp. 1-19.

Cheon, J.H. et al.; "Two Efficient Algorithms for Arithmetic of Elliptic Curves Using Frobenius Map"; Public Key Cryptography; First International Workshop on Practice and Theory in Public Key Cryptography - PCK 98; 1998; pp. 195-202.

Solinas, Jerome A.; "An Improved Algorithm for Arithmetic on a Family of Elliptic Curves" of "Lecture Notes in Computer Science"; Advances in Cryptology—CRYPTO '97; 17th Annual International Cryptology Conference; 1997; pp. 357-371.

Koblitz, Neal; "CM-Curves with Good Cryptographic Properties"; Advances in Cryptography—CRYPTO '91; 1991; pp. 279-287.

Solinas, Jerome A.; "Improved Algorithms for Arithmetic on Anomalous Binary Curves"; Technical Report; 1999; 69 pages.

Johnson, D. et al.; "The Elliptic Curve Digital Signature Algorithm (ECDSA)"; Certricom Corporation White Paper; 2001; pp. 2-56.

Kelsy, J. et al.; "Side Channel Cryptanalysis of Product Ciphers"; Journal of Computer Security 8; 2000,; pp. 141-158.

Kocher, Paul C.; "Timing Attacks on Implementations of Diffie-Hellman, RSA, DSS, and Other Systems", Advances in Cryptology-CRYPTO '96; Proceedings of the 16th Annual International Cryptology Conference; vol. 1109; 1996; pp.

Kocher, P. et al.; "Differential Power Analysis"; Advances in Cryptology-CRYPTO '99; Proceedings of the 19th Annual International Cryptology Conference; 1999; pp. 388-397.

Wharton, John; "An Introduction to the Intel-MCS-51 Single-Chip Microcomputer Family"; Intel Corporation; Intel Application No. AP-69; 1980; 30 pages.

Kocher, P. et al.; "Introduction to Differential Power Analysis and Related Attacks"; Cryptography Research; 1998, 5 pages.

Examiner's Report issued in Canadian Application No. 2,259,089 on Feb. 2, 2009; 3 pages.

Moller, Bodo; "Algorithms for Multi-Exponentiation"; Selected Areas in Cryptography-SAC 2001; LNCS 2259; pp. 165-180.

Yen, S.M, et al.; "Multi-Exponentiation"; IEEE Proceedings Comput. Digit. Tech.; vol. 141, No. 6; 1994; pp. 325-326.

Proceeding further with the European Application Pursuant to Rule 70(2) EPC issued in European Application No. 06701572.7 on Oct. 23, 2009; 6 pages.

Communication Pursuant to Article 94(3) EPC issued in European Application No. 06701572.7 on Mar. 8, 2010; 4 pages.

Communication Pursuant to Article 94(3) EPC issued in European Application No. 06701572.7 on Jul. 16, 2010; 4 pages.

Communication under Rule 71(3) Epc issued in European Application No. 06701572.7 on Apr. 4, 2011; 6 pages.

International Search Report and Written Opinion of the International Searching Authority issued in International Application No. PCT/CA2006/00058 on May 1, 2006; 11 pages.

International Preliminary Report on Patentability issued in International Application No. PCT/CA2006/00058 on Aug. 2, 2007; 8 pages.

Dirichlet, "Bericht über die zur Bekanntmachung geeigneten Verhandlungen der Königl. Preufs. Akademie der Wissenschaften zu Berlin", 1842, 4 pages; Certification and English Translation: "Report Concerning the Negotiations of the Royal Prussian Academy of Sciences at Berlin Suitable to be Announced", 1842, 5 pages.

A. Antipa, D. R. L. Brown, R. P. Gallant, R. Lambert, R. Struik and S. A. Vanstone. Accelerated verification of ECDSA signatures. In B. Preneel and S. Tavares (eds.), Selected Areas in Cryptography: SAC 2005, Lecture Notes in Computer Science 3897, pp. 307-318. Springer, Aug. 2005.

IEEE P1363a/D12 (Draft Version 12), Jul. 16, 2003, 177 pages.

P. Nguyen, D. Stehl'e, 'Low-Dimensional Lattice-Basis Reduction Revisited,' ACM Transactions on Algorithms, vol. 5, No. 4, Article 46, Publication date: Oct. 2009, 48 pages.

R. Gallant, R. Lambert, S.A. Vanstone, 'Fast Point Multiplication on Elliptic Curves with Efficient Endomorphisms,' in Proceedings of Advances in Cryptology—CRYPTO 2001, Lecture Notes in Computer Science, vol. 2139, pp. 190-200, 2001.

G.H. Hardy, E.M. Wright, An Introduction to the Theory of Numbers, Fifth Edition, Oxford: Oxford University Press, 2000, pp. 169-170.

D.J. Johnson, A.J. Menezes, S.A. Vanstone, The Elliptic Curve Digital Signature Algorithm (ECDSA),' International Journal of Information Security, vol. 1, pp. 36-63, 2001.

L. Lov'asz, 'An Algorithmic Theory of Numbers, Graphs and Convexity,' CBMSNSF Regional Conference Series in Applied Mathematics, Band 50, SIAM Publications, 1986, 98 pages.

P. Nguyen, D. Stehl'e, 'Low-Dimensional Lattice-Basis Reduction Revisited,' ANTS 2004, Lecture Notes in Computer Science, vol. 3076, pp. 338-357, 2004.

J. Solinas, 'Low-Weight Binary Representations for Pairs of Integers,' Centre for Applied Cryptographic Research, Corr 2001-41, University of Waterloo, Ontario, Canada, 2001, 24 pages.

Henry Cohen, A Course in Computational Algebraic Number Theory, Springer, ISBN 0-387-55640-0, pp. 83-96.

Official Action issued in Japanese Application No. 2007-550647 on Jul. 19, 2011 (3 pages); with English translation (5 pages).

U.S. Department of Commerce/National Institute of Standards and Technology; Federal Information Processing Standards Publication (FIPS PUB 180-2); "Secure Hash Standard"; Aug. 1, 2002; 75 pages.

U.S. Department of Commerce/National Institute of Standards and Technology; Federal Information Processing Standards Publication (FIPS PUB 186-2); "Digital Signature Standard (DSS)"; Jan. 27, 2000; 76 pages.

Hankerson, Darrel et al.; "Guide to Elliptic Curve Cryptography"; ISBN 0-387-95273-X; 2004; 332 pages.

Public-Key Cryptography for the Financial Services Industry: Digital Signature Algorithms Providing Partial Message Recovery: Part 1: Elliptic Curve Pintsov-Vanstone Signatures (ECPVS), Draft American National Standard X9.92/2002, 2002, 65 pages.

Ansi, X9.62/1998, Public Key Cryptography for the Financial Services Industry: The Elliptic Curve Digital Signature Algorithm (ECDSA), Jan. 1999, 195 pages.

Extended European Search Report issued in European Application No. 11178908.7 on Nov. 15, 2011; 6 pages.

Official Action issued in Japanese Application No. 2007-550647 on Nov. 25, 2011; 4 pages.

* cited by examiner

ACCELERATED VERIFICATION OF DIGITAL SIGNATURES AND PUBLIC KEYS

This application claims priority from U.S. Provisional Application No. 60/644,034 filed on Jan. 18, 2005, the content of which is hereby incorporated by reference.

The present invention relates to computational techniques used in cryptographic algorithms.

BACKGROUND TO THE INVENTION

The security and authenticity of information transferred through data communication systems is of paramount importance. Much of the information is of a sensitive nature and lack of proper control may result in economic and personal loss. Cryptographic systems have been developed to address such concerns.

Public key cryptography permits the secure communication over a data communication system without the necessity to transfer identical keys to other parties in the information exchange through independent mechanisms, such as a courier or the like. Public key cryptography is based upon the generation of a key pair, one of which is private and the other public that are related by a one way mathematical function. The one way function is such that, in the underlying mathematical structure, the public key is readily computed from the private key but the private key cannot feasibly be ascertained from the public key.

One of the more robust one way functions involves exponentiation in a finite field where an integer k is used as a private key and the generator of the field $\alpha$ is exponentiated to provide a public key $K=\alpha^k$. Even though $\alpha$ and K are known, the underlying mathematical structure of the finite field makes it infeasible to obtain the private key k. Public key cryptography may be used between parties to establish a common key by both parties exchanging their public keys and exponentiating the other parties public key with their private key. Public key cryptography may also be used to digitally sign a message to authenticate the origin of the message. The author of the message signs the message using his private key and the authenticity of the message may then be verified using the corresponding public key.

The security of such systems is dependent to a large part on the underlying mathematical structure. The most commonly used structure for implementing discrete logarithm systems is a cyclic subgroup of a multiplicative group of a finite field in which the group operation is multiplication or cyclic subgroups of elliptic curve groups in which the group operation is addition.

An elliptic curve E is a set of points of the form (x, y) where x and y are in a field F, such as the integers modulo a prime p, commonly referred to as Fp, and x and y satisfy a non-singular cubic equation, which can take the form $y^2=x^3+ax+b$ for some a and b in F. The elliptic curve E also includes a point at infinity, indicated as O. The points of E may be defined in such a way as to form a group. The point O is the identity of the group, so that O+P=P+O=P for any point P in E. For each point P, there is another point, which we will write as −P, such that P+(−P)=P+(−P)=O. For any three points P, Q, R in E, associativity holds, which means that P+(Q+R)=(P+Q)+R. Identity, negation and associativity are the three axiomatic properties defining a group. The elliptic curve group has the further property that it is abelian, meaning that P+Q=Q+P.

Scalar multiplication can be defined from addition as follows. For any point P and any positive integer d, dP is defined as P+P+ . . . +P, where d occurrences of P occur. Thus 1P=P and 2P=P+P, and 3P=P+P+P, and so on. We also define 0P=O and (−d)P=d(−P).

For simplicity, it is preferable to work with an elliptic curve that is cyclic (defined below) although in practice, sometimes a cyclic subgroup of the elliptic curve is used instead. Being cyclic means that there is a generator G, which is a point in the group such that every other point P in the group is a multiple of G, that is to say, P=dG, for some positive integer d. The smallest positive integer n such that nG=O is the order of G (and of the curve E, when E is cyclic). In cryptographic applications, the elliptic curves are chosen so that n is prime.

In an elliptic curve cryptosystem, the analogue to exponentiation is point multiplication. Thus it is a private key is an integer k, the corresponding public key is the point kP, where P is a predefined point on the curve that is part of the system parameters. The seed point P will typically be the generator G. The key pair may be used with various cryptographic algorithms to establish common keys for encryption and to perform digital signatures. Such algorithms frequently require the verification of certain operations by comparing a pair of values as to confirm a defined relationship, referred to as the verification equality, between a set of values.

One such algorithm is the Elliptic Curve Digital Signature Algorithm (ECDSA) used to generate digital signatures on messages exchanged between entities. Entities using ECDSA have two roles, that of a signer and that of a verifier. A signer selects a long term private key d, which is an integer d between 1 and n−1 inclusive. The integer d must be secret, so it is generally preferable to choose d at random. The signer computes Q=dG. The point Q is the long term public key of the signer, and is made available to the verifiers. Generally, the verifiers will have assurance generally by way of a certificate from a CA, that Q corresponds to the entity who is the signer. Finding the private key d from the public key Q is believed to an intractable problem for the choices of elliptic curves used today.

For any message M, the signer can create a signature, which is a pair of integers (r, s) in the case ECDSA. Any verifier can take the message M, the public key Q, and the signature (r, s), and verify whether it was created by the corresponding signer. This is because creation of a valid signature (r, s) is believed to possible only by an entity who knows the private key d corresponding to the public key Q.

The signing process is as follows. First, the signer chooses some integer k in the interval [1, n−1] that is to be used as a session, or ephemeral, private key. The value k must be secret, so generally it is preferable to choose k randomly. Then, the signer computes a point R=kG that has co-ordinates (x, y). Next, the signer converts x to an integer x' and then computes r=x' mod n, which is the first coordinate of the signature. The signer must also compute the integer e=h(M) mod n, where h is some hash function, generally one of the Secure Hash Algorithms (such as SHA-1 or SHA-256) defined in Federal Information Processing Standard (FIPS) 180-2. Finally, the second coordinate s is computed as s=(e+dr)/s mod n. The components (r,s) are used by the signer as the signature of the message, M, and sent with the message to the intended recipient.

The verifying process is as follows. First the verifier computes an integer e=h(M) mod n from the received message. Then the verifier computes integers u and v such that u=e/s mod n and v=r/s mod n. Next, the verifier computes a value corresponding to the point R that is obtained by adding u G+v Q. This has co-ordinates (x, y). Finally the verifier converts the field element x to an integer x' and checks that r=x' mod n. If it does the signature is verified.

From the above, the verification of an ECDSA signature appears to take twice as long as the creation of an ECDSA signature, because the verification process involves two scalar multiplications, namely uG and vQ, whereas signing involves only one scalar multiplication, namely kG. Elliptic curve scalar multiplications consume most of the time of these processes, so twice as many of them essentially doubles the computation time. Methods are known for computing uG+vQ that takes less time than computing uG and vG separately. Some of these methods are attributed to Shamir, some to Solinas, and some to various others. Generally, these methods mean that computing uG+vQ can take 1.5 times as long as computing kG.

Another commonly used method to accelerate elliptic curve computations is pre-computing tables of multiples of G. Such pre-computed tables save time, because the point G is generally a fixed system parameter that is re-used repeatedly. The simplest pre-compute table consists of all multiples $2^j G$ for j from 0 to t, where t is the bit-length of n. With such a pre-computed table, computing an arbitrary multiple kG can be done with an average of t/2 point additions or less. Roughly, this a threefold improvement over the basic method of computing kG, which clearly demonstrates the benefit of pre-computation. Generally speaking, larger pre-computed tables yield better time improvements. The memory needed to store the pre-computed tables has a significant cost. Therefore, implementers must balance the benefit of faster operations with the extra cost of larger tables. The exact balance generally depends of the relative importance of speed versus memory usage, which can vary from one implementation to another.

Pre-computation can also be applied to the public key Q. Generally, the public key Q tends to vary more often than G: as it is different for each correspondent, whereas G is always fixed for a given system. Therefore the cost of one-time pre-computation for Q is amortized over a smaller number of repeated run-time computations involving Q. Nevertheless, if Q is to be used more than once, some net savings on time will be achieved. Public keys that are heavily used include those of certification authorities (CA), especially root, trusted or anchor CA public keys (that are pre-installed into a system). Therefore, pre-computation may be worthwhile for CA elliptic curve public keys where, for example, the protocol requires verification of a CA's certificate. Another difference between pre-computations of Q versus G is the cost of storing or communicating the pre-computed tables. Each public key Q requires its own pre-computed table. In a system with many distinct public keys, these costs may accumulate to the point that any benefit of faster computation is offset by the need to store or communicate keys. The net benefit depends on the relative cost of time, memory and bandwidth, which can vary tremendously between implementations and systems. Again, in the case of CA public keys, especially root, trusted or anchor CA keys, these keys tend to be fewer in number than end-entity public keys, so that the cost of pre-computation will generally be less and amortized over more operations.

Tables of multiples of points are not merely useful during pre-computation. In practice, such tables are commonly generated at run-time, during an initial phase of each computation. The savings provided by these tables is essentially that of avoiding certain repetitious operations that occur within a single computation. A single computation has less internal repetitions than two distinct computations have in common, so that saved repetition amount to less than pre-computation. Nevertheless, it has been found that with a judicious choice of table, the time need for a single computation can be reduced. The table takes time to compute, and computation of the table cannot be amortized over multiple computations, so is incurred for every computation. Experience has shown that particular tables decrease the amount of time needed because computing the table takes less time than the repetition operations that would have otherwise been needed. Usually, there is an optimum size and choice of table. Another cost of such tables is the memory needed to temporarily store the table. The cost of such memory may affect the optimal choice of table. Windowing methods are examples of such tables computed on the fly.

Not withstanding all of the above known techniques for efficient implementation, further efficiency improvements are desirable. In particular, the efficiency of verifying of ECDSA signatures is particularly desirable. Extensive pre-computation allows ECDSA signatures to be generated very quickly. In fact, ECDSA signature generation is one of the fastest digital signature generation algorithms known. On the other hand, ECDSA signature verification is relatively slower, and there are other signature algorithms have similar verification times to ECDSA. Improvement of ECDSA verification time is therefore important, especially for environments where verification time is a bottleneck.

In general, there is a need to enhance the efficiency of performing a computation to verify that a value corresponds to the sum of two of the values. It is therefore an object of the present invention to obviate or mitigate the above disadvantages.

SUMMARY OF THE INVENTION

In general terms the present invention provides a method and apparatus for verifying the equality of a relationship between the sum of scalar multiples of a pair of points on an elliptic curve and a third point on said curve. The method comprises the steps of i) obtaining a pair of integers of bit length less than one of said scalars and whose ratio corresponds to said scalar; ii) substituting said integers for said scalars in said relationship to obtain an equivalent relationship in which at least one of said terms is a scalar multiple of one of said points with reduced bit length, and iii) computing said equivalent relationship to verify said equality.

The method may be used for verifying that a value representative of a point R on an elliptic curve corresponds to the sum of two other points, uG and vQ. Integers w and z are determined such that the bit lengths of the bit strings representing w and z are each less than the bit length of the bit string of the integer v, and such that v=w/z mod n. With such w and z, the equation R=uG+vQ can be verified as −zR+(zu mod n)G+wQ=O.

Preferably, the bit lengths of w and z are each about half the bit length of n, which means that both w and z are both no larger than about $n^{1/2}$ The point −zR+(zu mod n)G+wQ can be computed efficiently because z and w are relatively small integers, and various of the methods for computing a sum faster than its parts can be used. The multiple (zu mod n) is full size, but within the context of an algorithm such as the ECDSA, the point G may be fixed or recurring. In this case the computation can be accelerated with the use of a stored table for G. Estimates of the times savings for this approach compared to conventional verification with tables for G are around 40%.

The values w and z may be obtained by using a partial completed extended Euclidean algorithm computation. Alternatively, a continued fractions approach may be utilised to obtain w and z efficiently.

In a further aspect of the invention there is provided a method of verifying a digital signature of a message performed by a cryptographic operation in a group of a finite field having elements represented by bit strings of defined maximum bit length. The signature comprises a pair of components, one of which is derived from an ephemeral public key of a signer and the other of which combines the message, the first component and the ephemeral public key and a long term public key of the signer. The method comprises the steps of recovering the ephemeral public key from the first component, establishing a verification equality as a combination of group operations on the ephemeral public key, the long term public key and a generator of the group with at least one of the group operations involving an operand represented by bit strings having a reduced bit length less than the defined maximum bit length, computing the combination and accepting the signature if said equality holds and rejecting the signature if said equality fails.

Preferably, the group is a elliptic curve group. As a further aspect, a method of generating a signature of a message by a cryptographic operation in an elliptic curve group of finite field comprising the steps of generating a pair of signature components with one of said components derived from a point representing an ephemeral public key and including in said signature an indicator to identify one of a plurality of possible values of said public key that may be recovered from said one component.

Embodiments of the invention will now be described by way of example only with reference to the accompanying drawings in which.

The present invention is exemplified by reference to verification of digital signatures, in particular those signatures generated using ECDSA. It will be apparent however that the techniques described are applicable to other algorithms in which verification of a pair of values representative of points on an elliptic curve is required to groups other than elliptic curve groups. Therefore the accompanying description of preferred embodiments is exemplary and not exhaustive.

Figure 1:
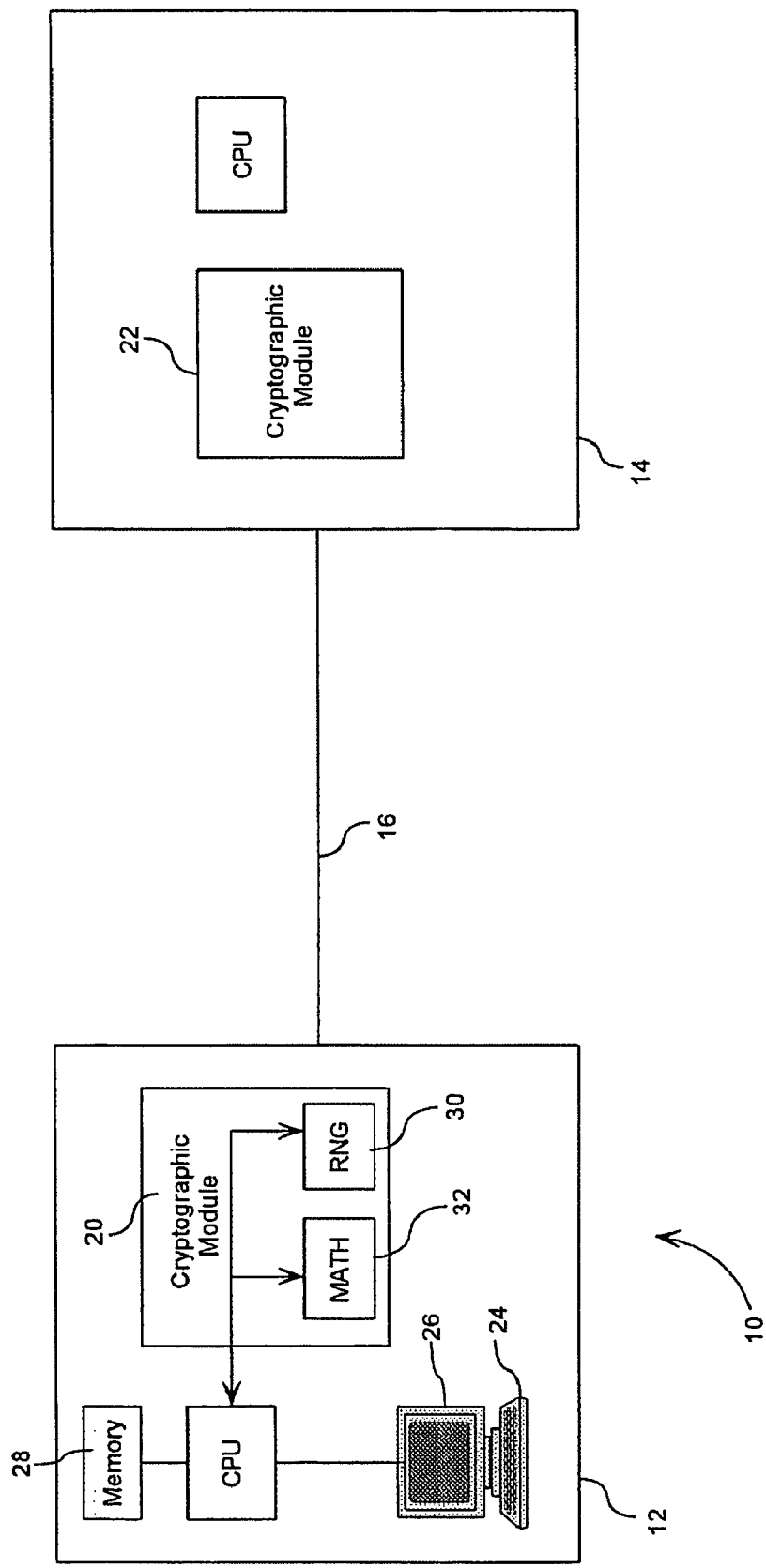
FIG. 1 is a schematic representation of a data communication system.

Referring therefore to FIG. 1, a data communication system 10 includes a pair of correspondents 12, 14 interconnected by a transmission line 16. The correspondents 12, 14 each include cryptographic modules 20, 22 respectively that are operable to implement one of a number of cryptographic functions. The modules 20, 22 are each controlled by CPU's incorporated in the correspondents 12, 14 and interfacing between input devices, such as a keyboard 24, a display device 26, such as a screen and a memory 28. Each cryptographic module includes internal processing capability including a random number generator 30 and an arithmetic processor 32 for performing elliptic curve computations such as point addition. It will be appreciated that the correspondents 12, 14 may be general purpose computers connected in a network or specialised devices such as cell phones, pagers, PDA's or the like. The communication link 16 may be a land line or wireless or a combination thereof. Similarly the cryptographic modules 20,22 may be implemented as separate modules or incorporated as an application within the CPU.

In the present example, the correspondent 12 prepares a message M which it wishes to sign and send to the correspondent 14 using an elliptic curve cryptosystem embodied within the modules 20, 22. The parameters of the system are known to each party including the field over which the curve is defined (in the present example Fp where p is a prime), the underlying curve, E, the generator point G that generates the elements that form the group in which crypto operations are performed and therefore defines the order, n, of the group, and a secure hash function H, generally one of the Secure Hash Algorithms (such as SHA-1 or SHA-256) defined in Federal Information Processing Standard (FIPS) 180-2. Each element is represented as a bit string having a maximum bit length sufficient to represent each element in the group.

Figure 2:
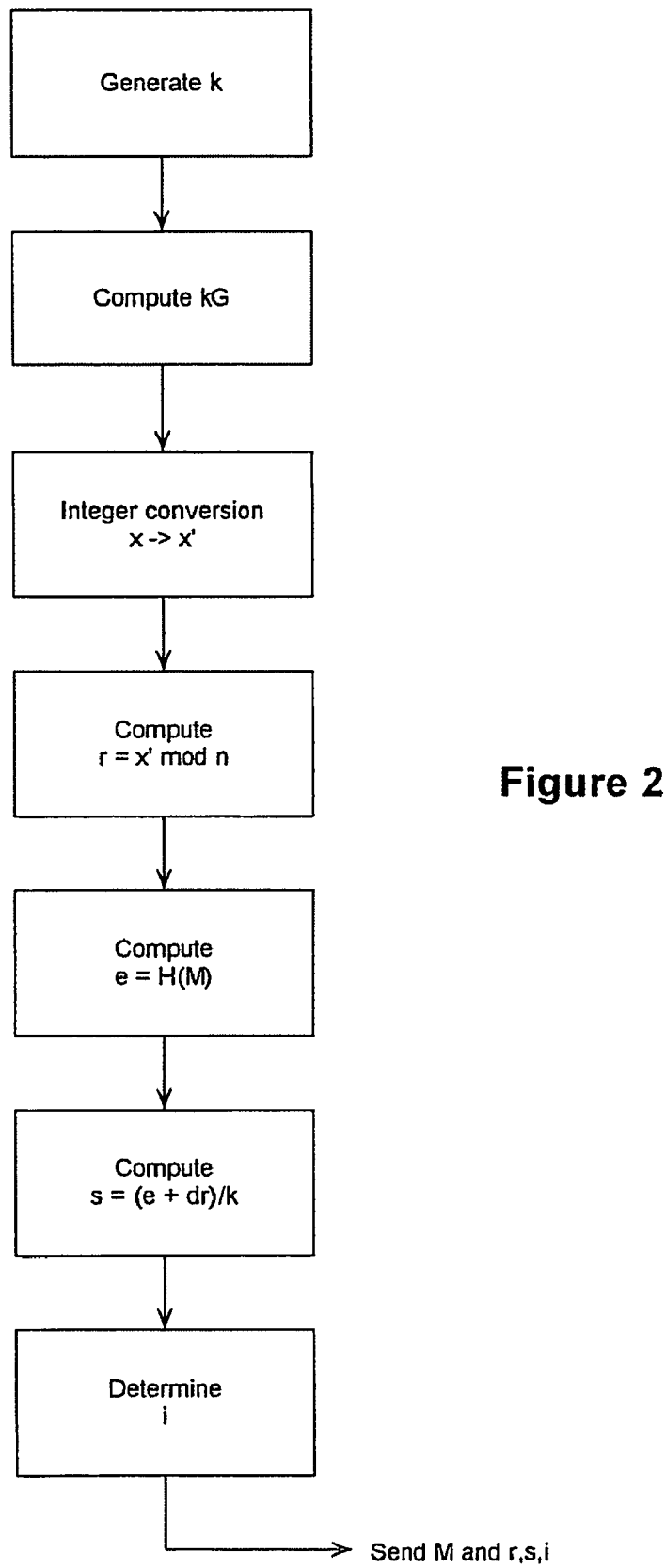
FIG. 2 is a flow chart illustrating the steps in performing a signature for an ECDSA signature scheme.

The steps taken to sign the message are shown in FIG. 2. Initially therefore the correspondent generates an integer k by the random number generator 30 and utilises the arithmetic unit 32 to compute a point $R=kG$ that has co-ordinates $(x, y)$. The correspondent 12 converts the co-ordinate x to an integer x' and computes $r=x' \mod n$, which is the first component of the signature. The correspondent 12 also computes the integer $e=H(M) \mod n$, where H is the secure hash function. Finally, the second component s is computed as $s=(e+dr)/k \mod n$.

In addition to the components r and s, the signature includes information i to permit the co-ordinates representing the point R to be recovered from the component r. This information may be embedded in the message M, or forwarded as a separate component with r and s and will be used by the verifier to compute the value R If the elliptic curve is defined over a field F of prime order p, and the elliptic curve E is cyclic or prime order n, then i can generally be taken as $y \mod 2$, i.e., a zero or one. The indication i is required during recovery R, where the verifier sets $x=r$. It is very likely that $x=r$ because n and p are extremely close for typical implementations. Given x, there are exactly two values y such that $(x, y)$ is on the curve, and these two values y and y' have different values mod 2. Thus i is just a single bit whose value indicates which of the y's is to be used, and adds relatively little cost to the signature.

Figure 3:
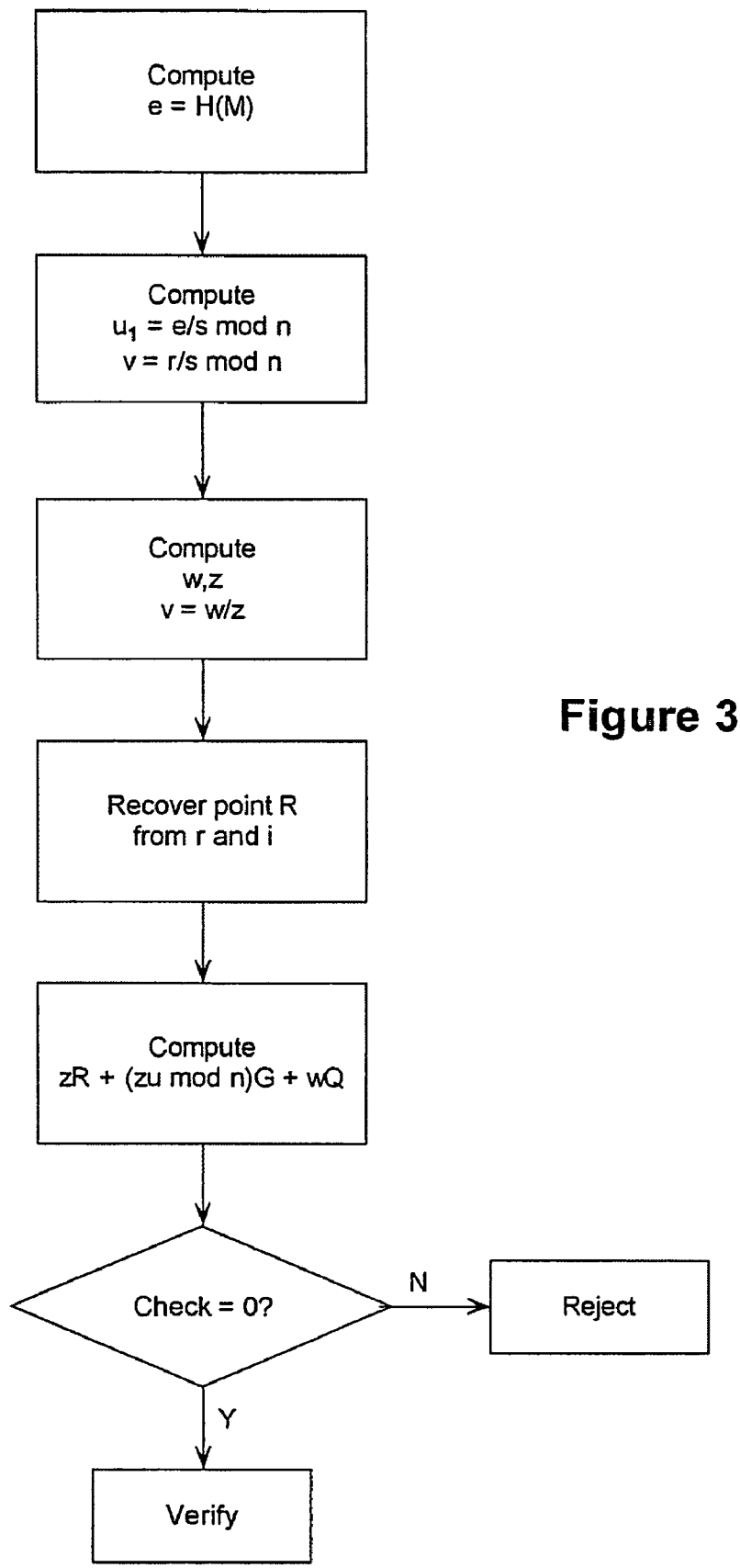
FIG. 3 is a flow chart showing the verification of a ECDSA signature.

Once the message is signed it is forwarded together with the components r,s, and i across the link 16 to the recipient correspondent 14. To verify the signature the steps set out in FIG. 3 are performed. First the correspondent 14 computes an integer $e=H(M) \mod n$. Then the correspondent utilises the arithmetic unit 32 to compute a pair of integers u and v such that $u=e/s \mod n$ and $v=r/s \mod n$.

The correspondent 14 also computes a pair of integers w and z using an iterative algorithm such that the maximum bit lengths of w and z are each less than the maximum bit length of the elements of the group, and such that $v=w/z \mod n$. The bit lengths of w and z are preferably about one half the bit length of the elements. Such w and z can be found conveniently with the extended Euclidean algorithm and stopping at an appropriate point, typically half-way where w and v are half the bit length of the elements. Such an algorithm is exemplified, for example as Algorithm 3.74 in Guide to Elliptic Curve Cryptography by Henkerson, Menezes and Vanstone published by Springer under ISBN 0-387-95273, which represents a quantity k as $k=k_1+k_2\lambda$ mod n, where the bit lengths of $k_1$ and $k_2$ are about half the length of n. This equation can be re-written as $\lambda=(k-k_1)/k_2$ mod n. By setting k=1 and $\lambda$=v, then the above referenced Algorithm 3.74 can be used to obtain n established for the system, k set to 1 and the value for v used as the variable input. The output obtained $k_1$ $k_2$ can then be used to compute $w=1-k_1$ and $k_2$ used as $w=1-k_1$ and $z=k_2$.

Thus, the arithmetic unit 32 is used to implement the following pseudo-code to obtain the values of w and z.

Let r0=n and t0=0.
Let r1=v and t1=1.
For i>1, determine ri, ti as follows:
Use the division algorithm to write $r\_(i-1)=qi\ r\_(i-2)+ri$, which defines ri.

Let $ti=t\_(i-1)+qit\_(i-2)$.

Stop as soon as ri<sqrt(n)=n^($\frac{1}{2}$), or some other desired size.

Set w=ri and z=ti. Note that ri=ti v mod n, so w=z v mod n, so v=w/z mod n, and both w and z have about half the bit length of n, as desired.

The correspondent 14 also recovers a value corresponding to the point R utilising the information i. In its simplest form this is obtained by substituting the value of r received in the curve and determining which of the two possible values of y correspond to the sign indicated by the bit i.

With the value of R recovered, the verification of the ECDSA, namely that R=uG+vQ, may proceed with a revised verification by confirming that the verification equality −zR+(zu mod n)G+wQ=O. The verification equality −zR+(zu mod n)G+wQ involves a combination of group operations on each of the ephemeral public key R, generator G and long term public key Q and can be computed efficiently because z and w are relatively small integers. As will be described below, various of the methods for computing a sum faster than its parts can be used. The multiple (zu mod n) is full size, but within the context of a system such as the ECDSA in which the points have varying longevity, the point G may be considered fixed or recurring. In this case the computation can be accelerated with a precomputed table for G, which may be stored in the memory 28 and accessed by arithmetic unit 32 as needed. The representations of the points −zR and wQ which cannot effectively be precomputed have smaller bit lengths and therefore less time consuming computation. Assuming the computation returns a value O, the signature is assumed to be verified.

A number of different known techniques may be utilised to compute the required relationship, each of which may be implemented using the arithmetic processor 32. Each offers different advantages, either in speed or computing resources, and so the technique or combination of techniques will depend to a certain extent on the environment in which the communication system is operating. For the sake of comparison, it will be assumed that u and v are integers of bit length t. Computing uG and vQ separately requires about 3t/2 point operations, assuming no pre-computation, for a total of about 3t point operations. Computing uG+vQ, which is the verification normally used for ECDSA, require t doublings, some of which can be simultaneous. Each of u and v are expected to have about t/2 bits set to one in their binary representation. In basic binary scalar multiplication, each bit of one requires another addition. (In more advanced scalar multiplication, signed binary expansion are used, and the average number of additions is t/3.) The total number of point operations is therefore t+(2(t/2))=2t on average as simultaneous doubling has saved t doublings.)

The revised verification instead uses a computation of a combination of the form aG+wQ+zR, where a is an integer of bit length t representative of the value zu mod n and w and z are integers of bit length about (t/2). Organising the verification computation in this way permits a number of efficient techniques to be used to reduce the number of point operations. An efficient way to compute this is to use a simultaneous doubling and add algorithm. For example, if the relationship 15G+20Q+13R is to be computed it can be done in stages as 2Q; G+2Q; G+2Q+R; 2G+4Q+2R; 3G+4Q+2R; 3G+5Q+2R; 3G+5Q+3R; 6G+10Q+6R; 7G+10Q+6R; 14G+20Q+12R; 15G+20Q+13R, for a total of 12 point additions, which is fewer than the method of generic scalar multiplication for each term separately. The main way that this method uses less operations is when it does simultaneous doubling, in steps as going from G+2Q+R to 2G+4Q+2R. In computing each term separately three operations would be used corresponding to this one operation. In fact, three simultaneous doubling were used, each saving two operations, so simultaneous doubling account precisely for all the savings. The number of doublings to compute the combination is governed by the length of the highest multiple, so it is t. The number of additions for a is (t/2), on average, and for Q and R it is (t/4) each on average. The total, on average, is t+(t/2)+(t/4)+(t/4)=2t. The algorithm is further exemplified as Algorithm 3.48 of the Guide to Elliptic Curve Cryptography detailed above.

Although there does not appear to be any savings over the previous method, which also took 2t point operations, advantage can be taken of the fact that in practice, for ECDSA, the generator G is constant. This allows the point $J=2^m$ G to be computed in advance, and stored in memory 28 for future use. If m is chosen to be approximately t/2, then $a \equiv a'+a''\ 2^m$, where a' and a" are integers of bit length about (t/2). Accordingly, aG+wQ+zR can be written as a'G+a"J+wQ+zR. In this form, all the scalar multiples have bit length (t/2). The total number of doublings is thus (t/2). Each of the four terms contributes on average (t/4) additions. The total number of point operations, on average, is the t/2+4(t/4)=3t/2.

Figure 4:
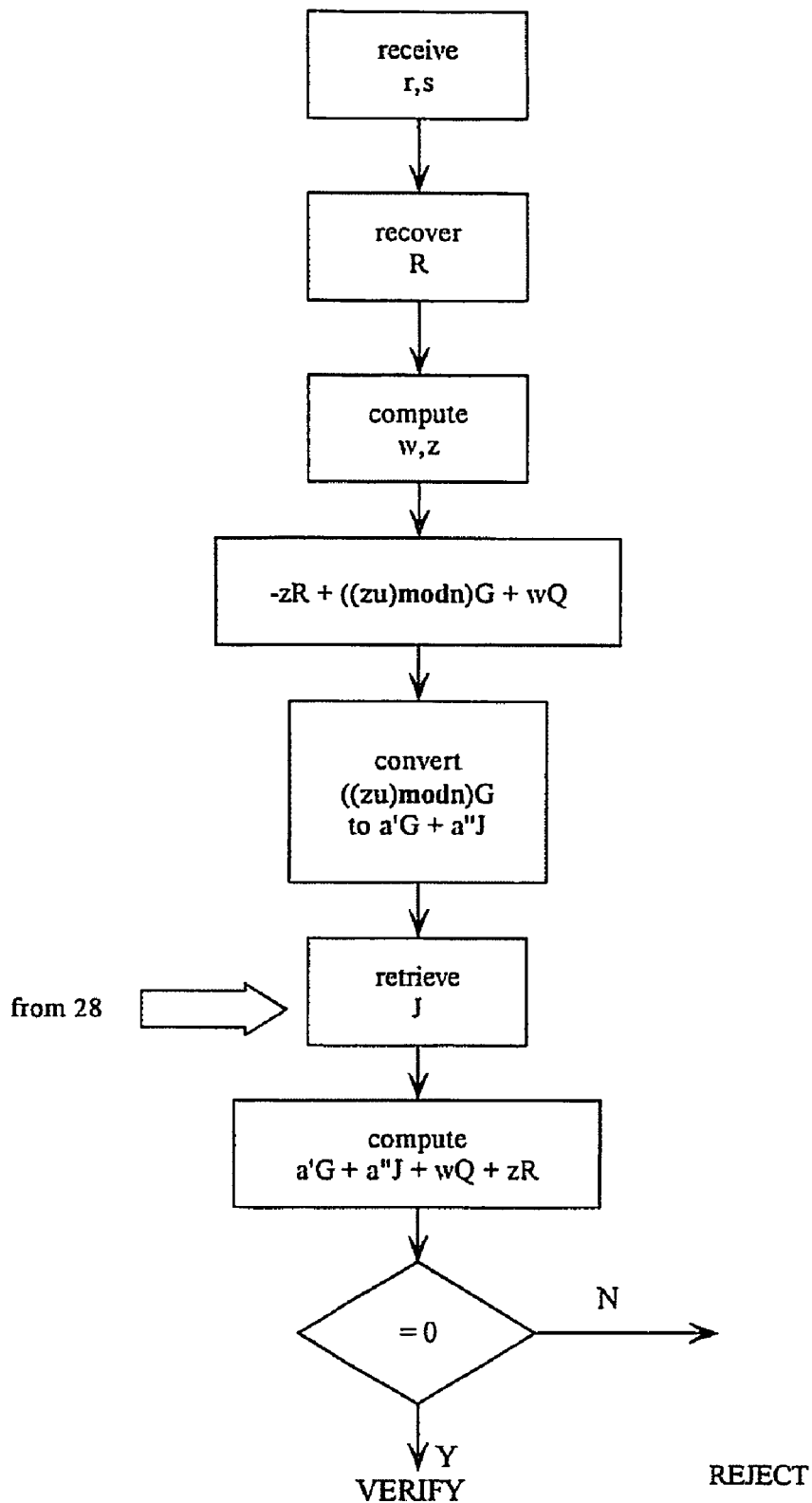
FIG. 4 is a flow chart showing the verification of an ECDSA signature using a precomputed value.

Accordingly, to verify the signature r,s, as shown schematically in FIG. 4, the recipient computes w, and z as described above, determines the value of a' and a" and performs a double and add computation to obtain the value of the verification representation. If this corresponds to the group identity, the verification is confirmed.

With the conventional verification equation approach of computing uG+vQ, the multiple v will generally be full length t, so the pre-computed multiple J of G will not help reduce the number of simultaneous doublings.

Therefore, by pre-computing and storing the single point J, verifying using the relationship −zR+(zu mod n)G+wQ=O allows an ECDSA signature to be verified in 25% less time. In other words, 33% more signatures can be verified in a given amount of time using the embodiment described above.

Figure 5:
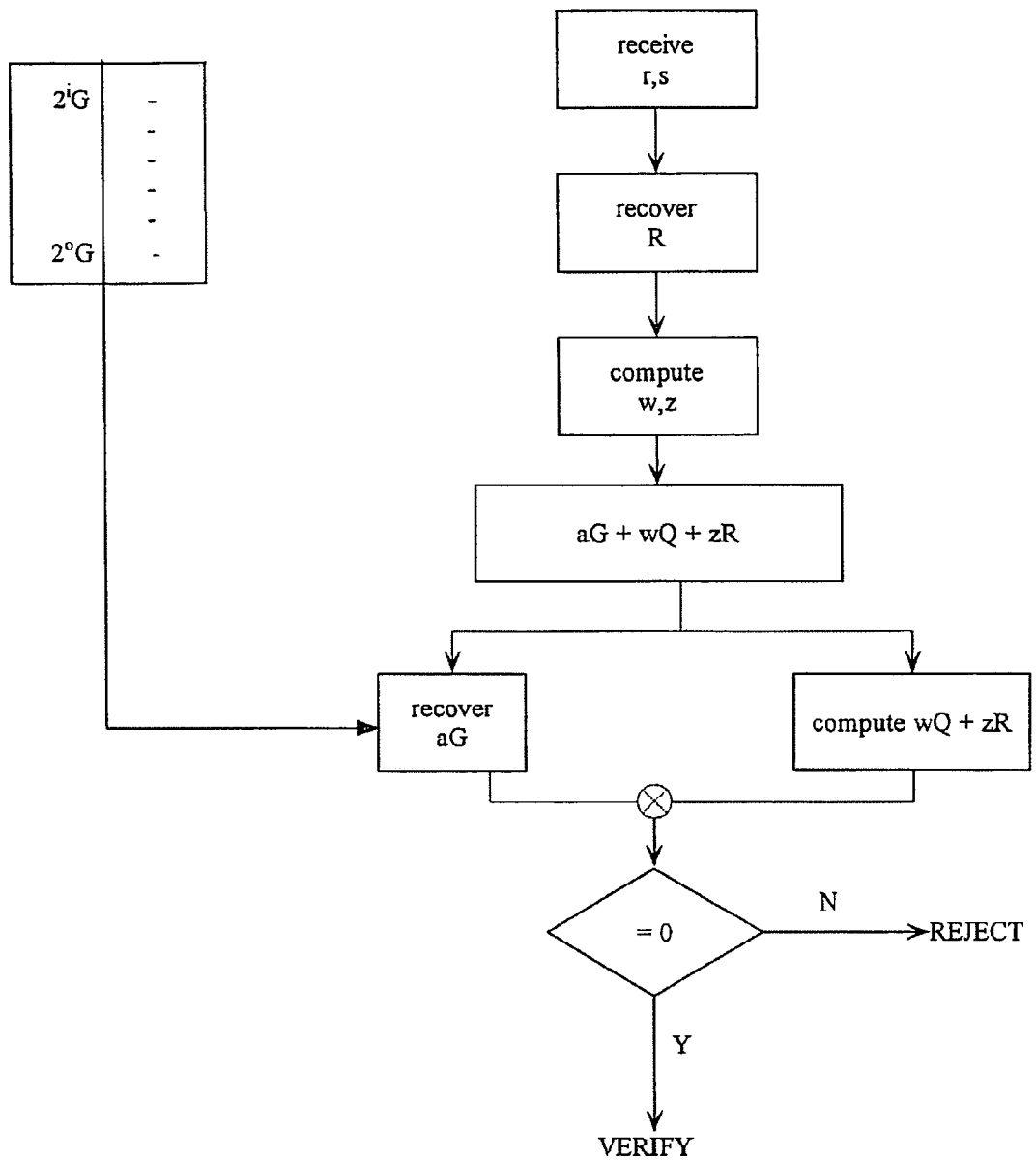
FIG. 5 is a flow chart showing the verification of an ECDSA signature using a table of precomputed values.

Alternatively, many implementations have sufficient memory 32 to pre-compute and store essentially all power of two multiples of G, essentially making it unnecessary to apply doubling operations to G. In such situations uG+vQ can be computed with t doublings of Q and (t/2) additions for each of G and Q. The total is still 2t operations. However, as shown in FIG. 5, the value of aG can be retrieved from the precomputed table stored in memory 32 so that computing aG+wQ+ zR, can be attained with (t/2) doublings for the wQ and zR, no doublings for G, t/2 additions for G, and t/4 additions for each of Q and R. The total is 3t/2 operations. The savings are the same as described with FIG. 4, when only one multiple of G was pre-computed and stored.

When signed binary expansions are used, then computing uG+vQ (without any pre-computation) requires about t doublings and (t/3) additions for each of G and Q, for a total of (10/6)t operations, on average. When signed binary expansions are used to find a'G+a''J+wQ+zR, about t/2 doublings are needed, and (t/6) additions for each of G, J, Q and R, for a total of (7/6)t operations, on average. The time to verify using the verification representation described above is 70% compared to without, or 30% less. This allows about 42% more signatures to verified in a given amount of time. The advantage of verifying using the revised verification representation is increased when combined with a more advanced technique of scalar multiplication referred to as signed binary expansions. This technique is very commonly used today in elliptic curve cryptography, so today's existing implementations stand to benefit from adoption of the verification representations.

Accordingly, it will be seen that by reorganizing the verification equation so that signature variables have a reduced bit length, the speed of verification may be increased significantly.

Figure 6:
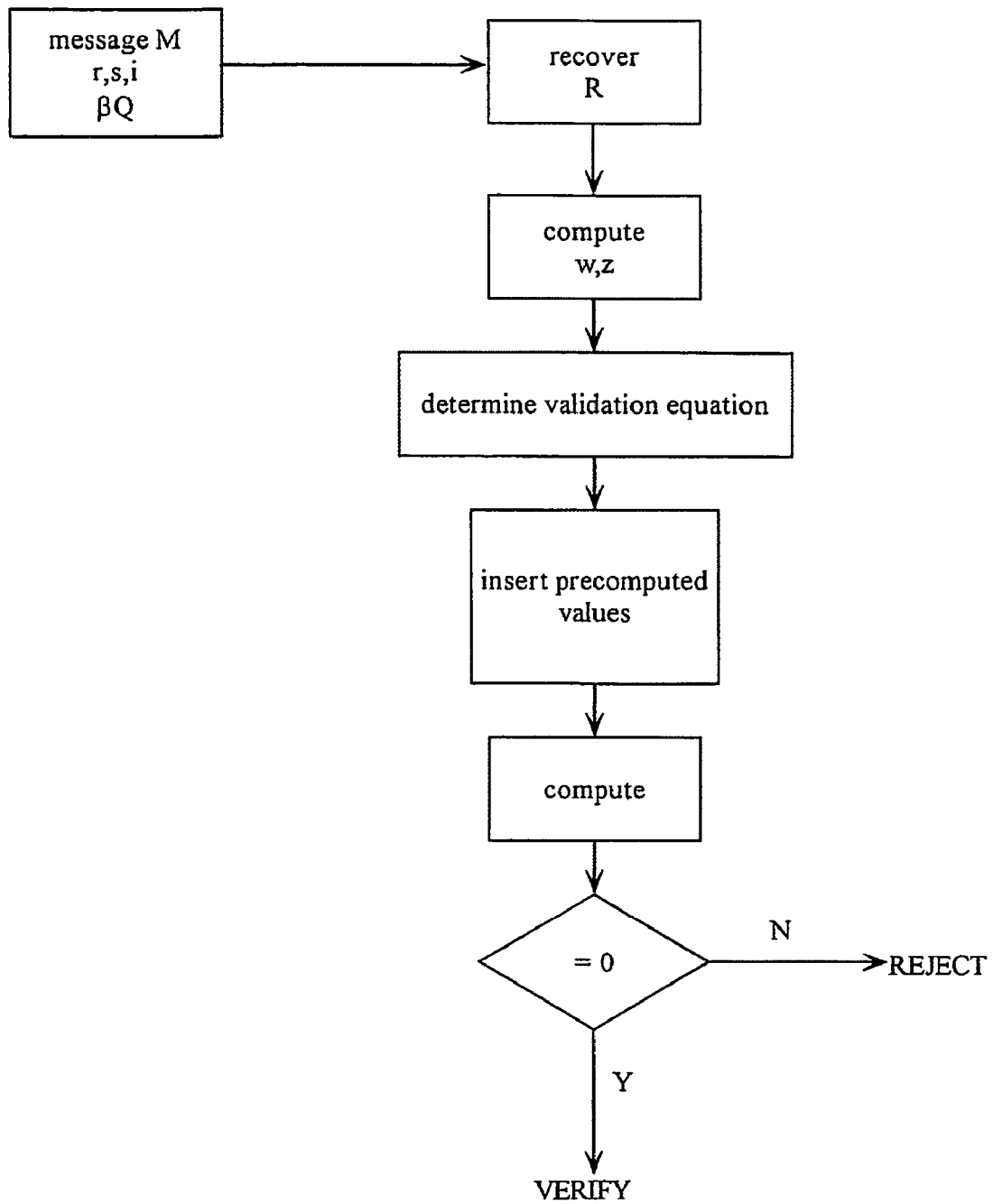
FIG. 6 is a flow chart showing the verification of an ECDSA signature using a precomputed value provided by the signer.

In the above embodiments, the recipient performs computations on the components r,s. To further accelerate signature verification as shown in FIG. 6, a signer may provide a pre-computed multiple of the public key Q to the verifier. The verifier can use the pre-computed multiple to further accelerate verification with Q. In this embodiment the verifier determines an equivalent equation to the ECDSA verification equation in the form aR+bG+cQ=O, where a is approximately $n^{1/3}$ and represents −z, b is approximately n and represents −zu mod n, and c is approximately $n^{2/3}$ and represents w. This can be done using the extended Euclidean algorithm as described above and stopping when the bit length of w is twice that of z. Again, therefore, the signor signs the message M and generates the signature components r,s. It also includes the identifier i in the message forwarded to the verifier. The signor pre-computes a multiple βQ where the scalar multiple β is a power of two nearest to $n^{1/3}$ and forwards it with the signature.

Upon receipt, the verifier computes w and z. The verifier then determines c=c'+c''β and b=b'+b''β+b'''β^2. In addition, since G is a fixed parameter, the verifier has pre-computed multiples of G of the form βG and β^2G. If n is approximately 2^t, then the verifier needs just t/3 simultaneous doubles to compute aR+bG+cQ. The verification can proceed on the basis aR+(b'+b''β+b'''β^2)G+(c'+c''β)Q=0. The precomputed values for G and Q can then be used and the verification performed. The verifier will need 2t/3 point additions, assuming that signed NAF is used to represent a, b and c. The total number of point operations is thus t, which represents a further significant savings compared to 3t/2 with the present invention and without the pre-computed multiple of Q such as described in FIG. 4 and compared to 2t using the conventional representations and without any pre-computed multiple of Q.

Given a pre-computed multiple of both Q and G, then uG+vQ can be computed with (t/2)+4(t/4)=3t/2 point operations using conventional representations. When pre-computed multiples of Q are feasible, then the signing equation, in the form above, again provide a significant benefit. The analyses above would be slightly modified when signed binary expansions are used.

With yet other known advanced techniques for computing linear combinations of points, some of which are discussed below, the use of the relationship allows signature verification to take up to 40% less time.

When implementing scalar multiplication and combinations, it is common to build a table at run-time of certain multiples. These tables allow signed bits in the representation of scalar multiple to be processed in groups, usually called windows. The table costs time and memory to build, but then accelerates the rest of the computation. Normally, the size of the table and associated window are optimized for overall performance, which usually means to minimize the time taken, except on some hardware implementation where memory is more critical. A full description and implementing algorithms for such techniques is to be found in *Guide to Elliptic Curve Cryptography*, referenced above at pages 98 et seq.

Such run-time tables, or windowing techniques, for scalar multiplication techniques can be combined with the revised verification equation in the embodiments described above. When using such tables, the savings are approximately the same as outlined above. The reason the savings are similar is the following simple fact. Tables reduce the number of adds, by pre-computing certain patterns of additions that are likely occur repeatedly, whereas the use of the revised verification relationship reduces the number of doubles by providing for more simultaneous doubling. In fact, when using tables, the number of adds is reduced, so the further reduction of the doubles provided by using the revised verification relationship has even more impact.

By way of an example, a common approach to tables, is to use a signed NAF window of size 5. Building a table for such a NAF requires 11 adds. In the example above where the signer sends a pre-computed multiple uQ of Q, the verifier can build tables for R, Q and uQ, at a cost of 33 adds. It is presumed that verifier already has the necessary tables built for G. Using the pre-computed doubles, the verifier only needs t/6 simultaneous additions for verification. These savings improve as the key size increases. For the largest key size in use today, the savings are in the order of 40%. Such tables do of course require the necessary memory 32 and so selection of the appropriate techniques is governed by the hardware available.

Similarly, computation techniques known as joint sparse forms could be used for computational efficiency.

As described above, the integers w, z were found using the extended Euclidean algorithm. Alternative iterative algorithms may be used, including the continued fractions approach. In the continued fractions approach, which is essentially equivalent to the extended Euclidean algorithm, one finds a partial convergent γ/δ to the fraction v/n, such that δ is approximately $n^{1/2}$. A property of the partial convergent is that |γ/δ−v/n|<1/δ^2. Multiplying this inequality by δn gives |γn−vδ|<n/δ, which is approximately $n^{1/2}$. Now set z=δ and w=γn−vδ. It is easy to check that v=w/z mod n, and note that w and z have the desired size.

As noted above, a conventional ECDSA signature, does not include the point R but instead, it includes an integer x' obtained from r=x mod n, where R=(x, y). The verifier therefore needs to recover R.

The method to recover R discussed above is to supplement the signature (r, s) with additional information i. This information can be embedded in the message, for example. The verifier can use r and i to compute R. When p>n, there is a negligible chance that x'>n and consequently r=x−n. If however such a case does occur, the verification attempt will fail.

Such a negligible failure rate for valid signatures can be accepted, or dealt with in the following manner.

Figure 7:
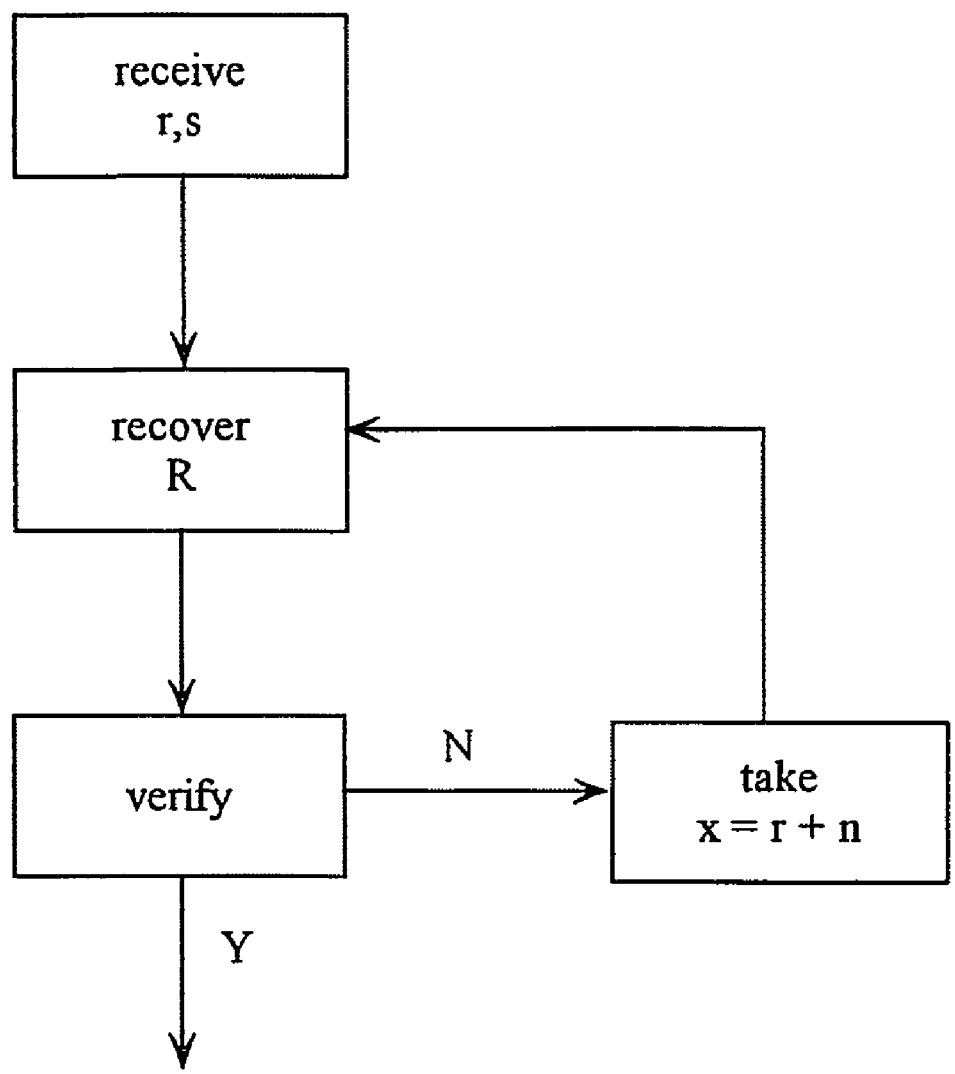
FIG. 7 is a flow chart showing steps taken by a verifier upon failing to verify.
Figure 8:
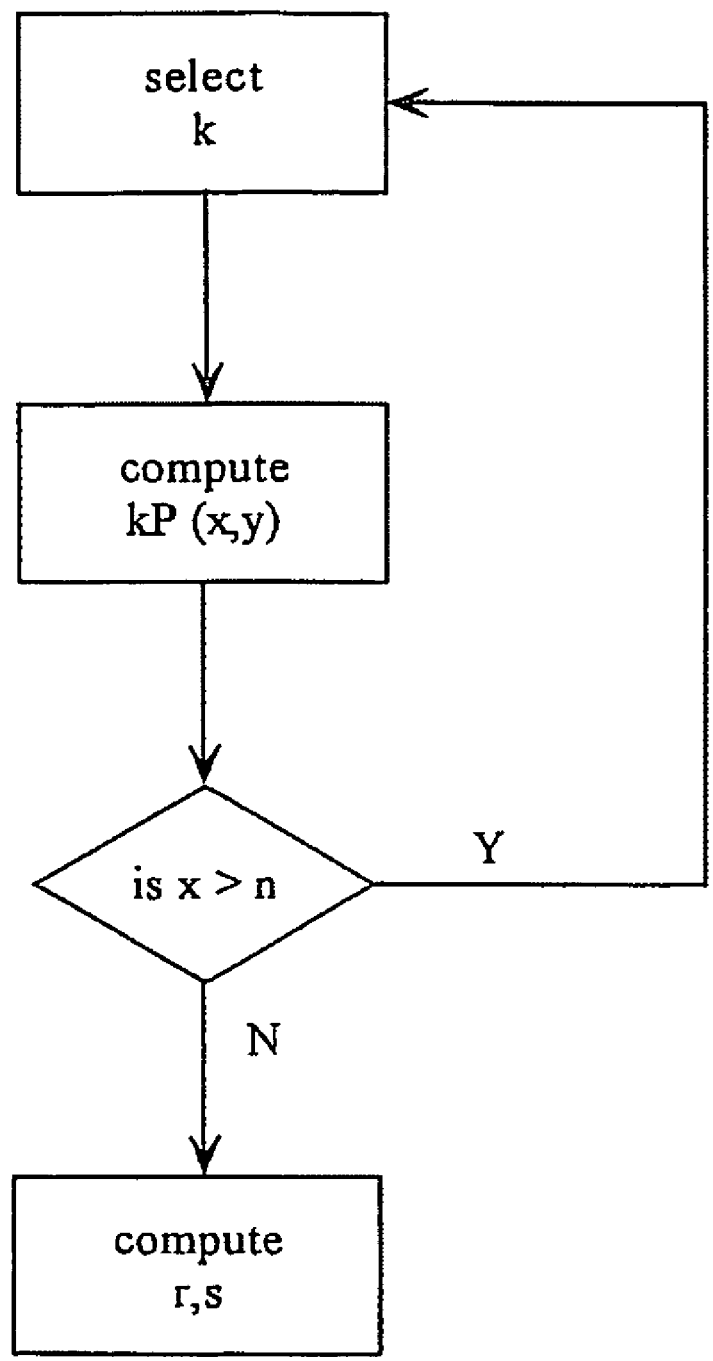
FIG. 8 is a flow chart showing steps taken by a signor to simplify verification.

As shown in FIG. 7, upon failure of the verification, at the verifier's expense the verifier can try $x=r+n$, and repeat the verification for another value of R, which will succeed in this particular case. Continued failure to verify will lead to rejection of the signature. Alternatively, as shown in FIG. 8 the signer can detect when $x>n$, which should happen negligibly often, and when this happens generate a different k and R. In either of the approaches, the problem arises so rarely that there is negligible impact on performance.

Other techniques for determining R can be utilized. In non-cyclic curves, there is a cofactor h, which is usually 2 or 4 in practice. This can lead to multiple possible values of x. The probability that $r=x$ is approximately $1/h$. In other situations, we will generally have $r=x-n$ (if $h=2$), or more generally $r=x-mn$ where (m is between 0 and $h-1$). Because p is approximately hn, then except in a negligible portion of cases there will be h possible values of x that are associated with r. To make recovery of x, and hence R easier, the signer can compute m and send it to the verifier within the message or as a further signature component. Alternatively, the verifier can make an educated guess for m. This can be illustrated in the case of $h=2$.

Corresponding to r is a correct x and a false value $x_f$. The false value $x_f$ has an approximately ½ chance of not corresponding to a value of the x-coordinate on E, and a further $1/h$ chance of not corresponding to a multiple of G. If one of the two values for x is invalid, either by not being on E or if it is not having order n, both of which can be efficiently checked, then that value can be eliminated. Thus at least ¾ of the time, the verifier will easily find the correct x. The remaining ¼ of the time at maximum, the verifier will not know which of the two x-values to try. If the verifier can guess one of the x values to verify, half the time, this guess will be right and the signature will verify, and the other half of the time, the first signature attempt will fail and the verifier must try the other x value. Therefore the probability that the verifier must verify two signatures is ⅛. Despite this probability of two verifications, the average verification is still improved. This can still provide the verifier time savings on average. If an accelerated verification takes 70% as long as a normal verify, but 12.5% of the verifies require twice as long as an accelerated verify, then the average time is 79% of a normal verify. Furthermore, as outlined further below, the signer can assist by providing m for the verifier or by doing the extra work of trying both values to ensure that only one m is valid.

A similar method may be utilized with a cofactor $h=4$. In fact, a higher value of h reduces the probability of each of the potential x values from being valid. There are more potential x values, but the analysis shows a similar benefit to the verifier. There are three false values of x, and each has a probability of ⅛ of appearing valid with a fast check. The chance that no false values appear to be a valid x with a fast check is thus $(⅞)^3$ which is about 77%. Most of the remaining 23% of the time, just one of the false x values will appear valid and potentially require a full signature verification.

Figure 9:
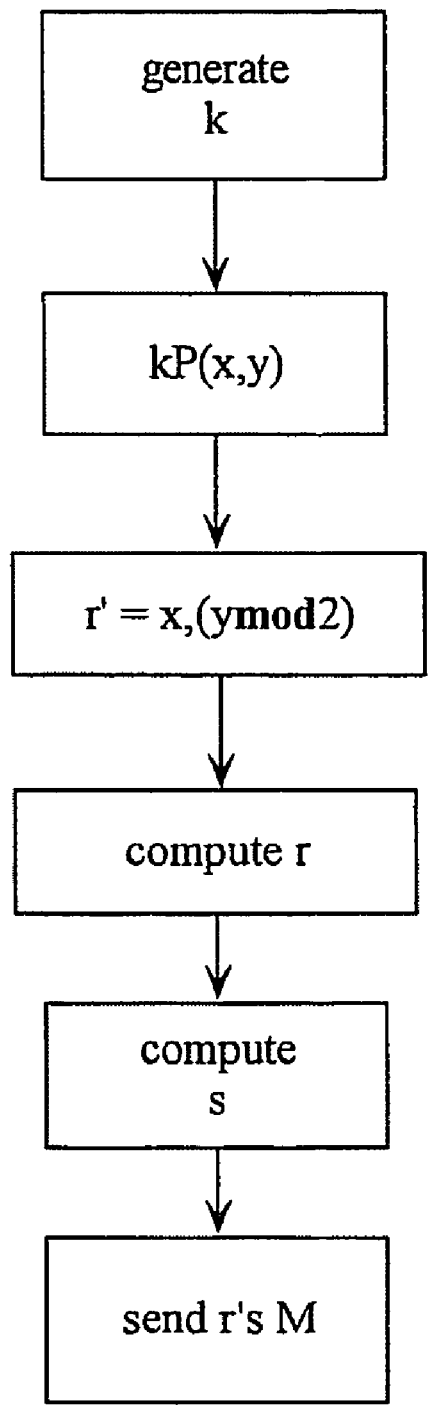
FIG. 9 is a flow chart showing an alternative signature protocol to simplify verification

The inclusion of i (and of m if necessary) is quite similar to replacing r by a compressed version of R consisting of the x coordinate and the first hit of the y coordinate. This alternative, of sending a compressed value of R instead of r, has the advantage of being somewhat simpler and not even a negligible chance of false recovery. Accordingly, as shown in FIG. 9, the signature is computed to provide a pair of components, r',s and forwarded with the message M to the recipient 14. The component r' is composed of the x co-ordinate of the point R and the first bit of the y co-ordinate. The component s is computed as before.

To verify the signature, the recipient 14 recovers the point R directly from the component r' and uses the verification equality equation $-zR+(zu \bmod n)G+wQ=O$ to confirm it corresponds to the group identity. The transmission of the modified co-ordinate r' simplifies the verification but does increase the bandwidth required.

Figure 10:
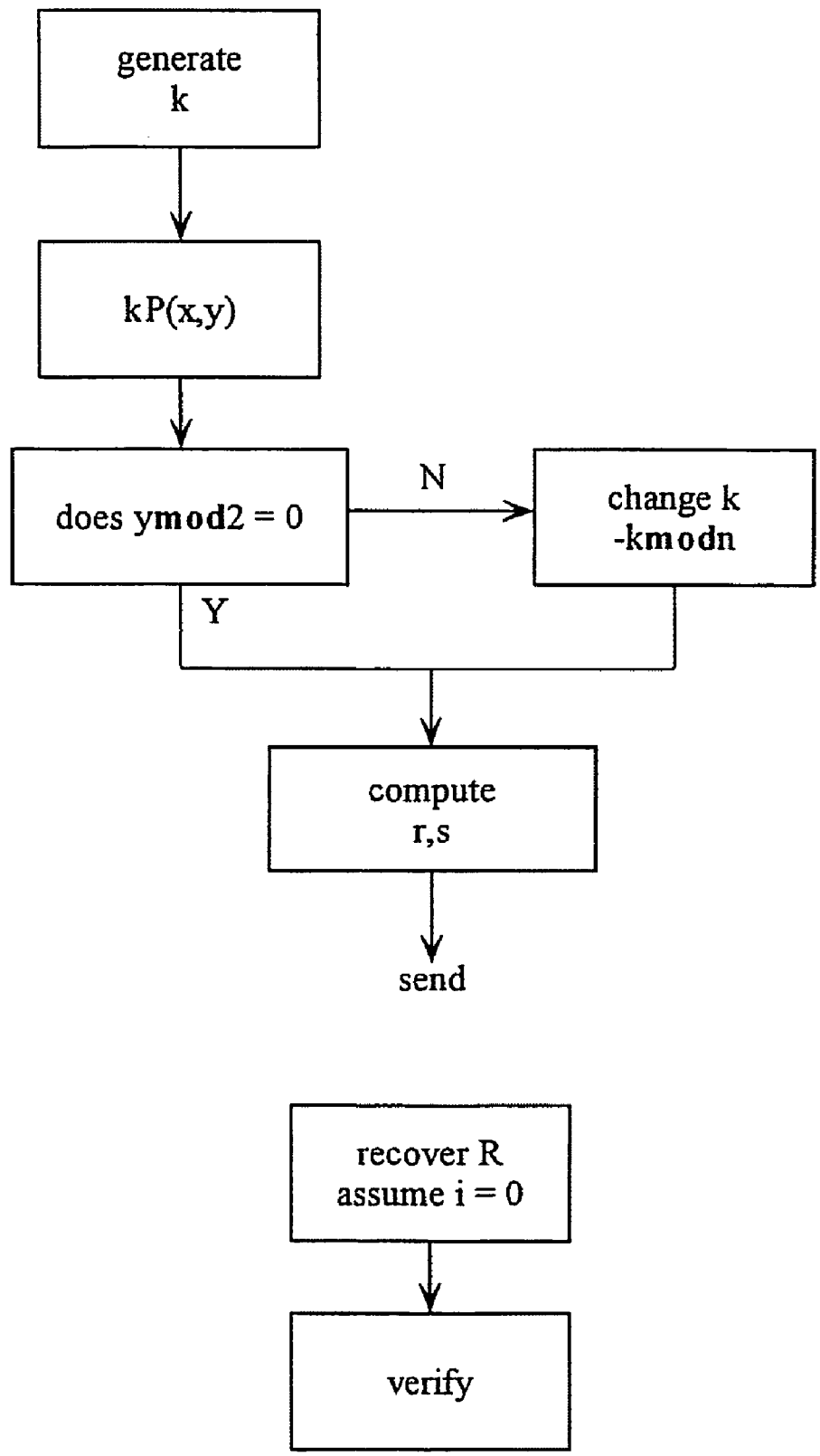
FIG. 10 is a flow chart showing an alternative technique performed by the Signor to simply verification.

In some situations, no channel may be available for the signer to send extra bits. For example, existing standards may strictly limit both the signature format and the message format leaving no room for the sender to provide additional information. Signers and verifiers can nevertheless coordinate their implementations so that R is recoverable from r. This can be arranged by the signer, as shown in FIG. 10, by ensuring that the value of x conforms to prearranged criteria. In the notation above, the signer will compute $R=kG=(x, y)$ as normal, and then in notation above compute $i=y \bmod 2$. If $i=1$, the signer will change k to $-k \bmod n$, so that R changes to $-R=(x, -y)$ and i changes to 0. When the verifier receives the signature, the verifier presumes that $i=0$, and thus recovers the signature. The value of i is thus conveyed implicitly as the value 0, and the signer has almost negligible cost for arranging this. Similarly, in non-cyclic elliptic curves, the signer may try to transmit m implicitly, which to some extent has already been described. In the case of $h=2$, recall that the ¼ of the time, the verifier may need to verify two signatures. Instead of the verifier doing this extra work, the signer can detect this ¼ case, and try another value for k and R instead, repeating the process until one is found that conforms to the criteria. The verifier can determine which value of x to use without verifying two signatures.

As an alternative to modifying R as described above, and to maintain strict conformity to the ECDSA standard, the value of s may be modified after computation rather than R. In this case, the signer notes that the value of R does not conform to the prearranged criteria and proceeds to generate r and s as usual. After s is computed, the value is changed to $(-s)$ to ensure the verification will be attained with the presumption of the prearranged value of y.

When a signer chooses a signature (r, s) such that R is implicitly recovered, an ordinary verifier will accept the signature as usual. Such signatures are perfectly valid. In other words, the revised verification is perfectly compatible with existing implementations of ECDSA verification. An accelerated verifier expecting an implicitly efficient signature but receiving a normally generated signature, will need to try two different values of i. If accelerated verification takes 60% of the time of a normal verify, then in a cyclic curve (cofactor $h=1$), the average time to needed verify a normal signature is 50% (60%)+50% (120%)=90% of a normal verify. This because 50% of the time a normal signature will have $i=0$, requiring just one implicitly accelerated verify, and the other 50% of the time, two accelerated verifies are needed. Thus an implicitly accelerated verify will still be faster than a normal verifier, even when the signatures are not implicitly accelerated.

Conventional signatures may also be modified, either by the signer or by a third party, to permit fast verification. In this case the signature is forwarded by a requestor to a third party who verifies the signature using the verification equality. In so doing the value of R is recovered. The signature is modified to include the indicator I and returned to the requestor. The modified signature may then be used in subsequent exchanges with recipients expecting fast verify signatures.

Figure 11:
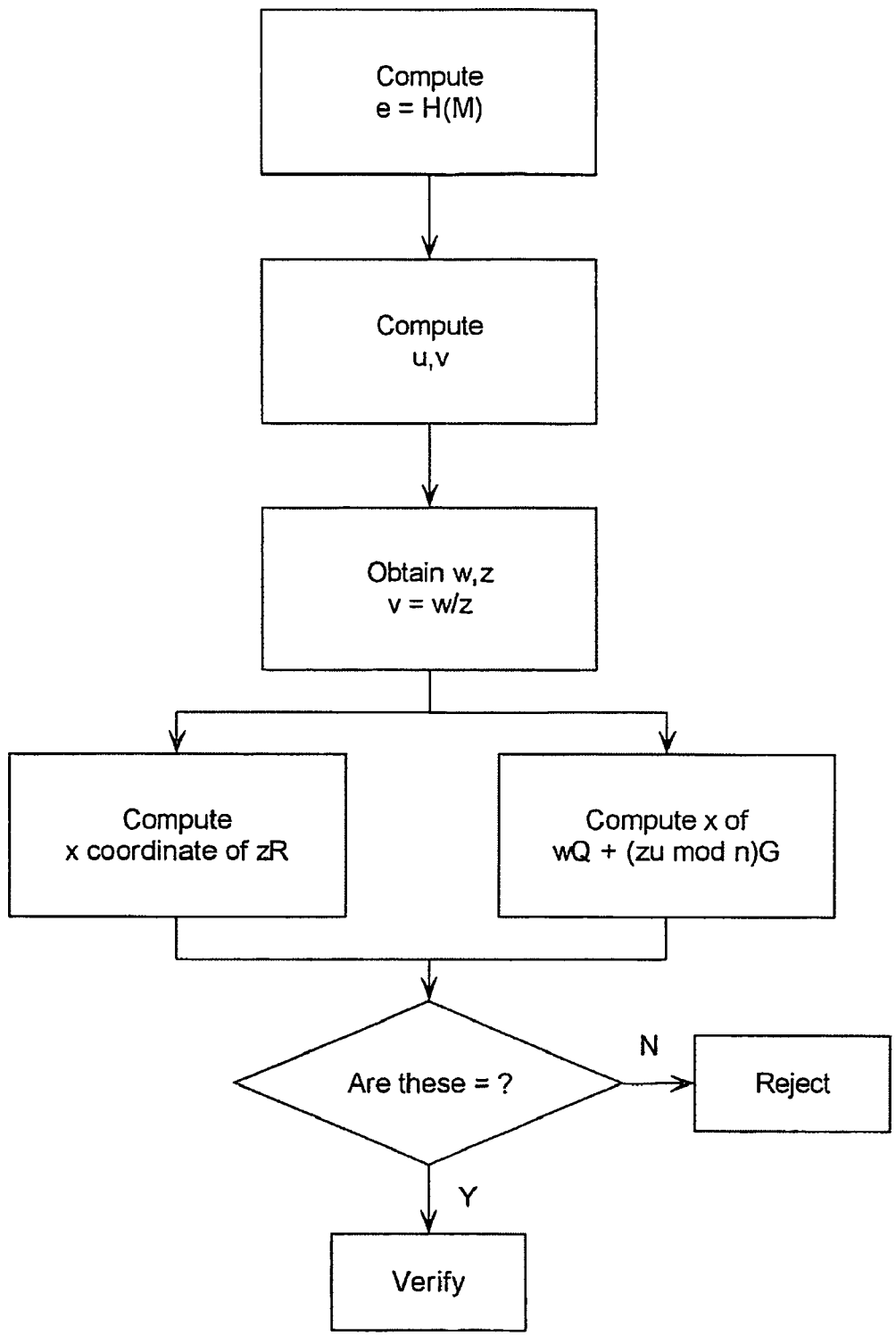
FIG. 11 is a flow chart showing an alternative verification ECDSA.

The above techniques recover R to permit a revised verification using the relationship $-zR+(zu \mod n)G+wQ=O$. However, where the ECDSA is being verified, the integers w and z may be used without recovery of R as shown in FIG. 11. It is possible to compute the x coordinate of zR and the x' coordinate of the point $wQ+(zu \mod n)G$, and then check the equality of these two x-coordinates. Only the x-coordinate of the point zR can be computed, as it is not possible to compute the y-coordinate zR directly without knowing the y-coordinate of R. However, there are several known methods to compute the x-coordinate of zR from the x-coordinate of R without needing the y coordinate of R. Such techniques include Montgomery's method set out on page 102 of the Guide to Elliptic Curve Cryptography identified above. It is then sufficient to check the x-coordinates of zR and $wQ+(zu \mod n)G$, because equality of the x-coordinates means that $wQ+(zu \mod n)G$ equal zR or $-zR$, which means $w/z \, Q+uG$ equals R or $-R$, which means $uG+vQ$ has the same x-coordinate as R. This is the condition for successful ECDSA validation. One recovers the x-coordinate of R from the signature component r using the methods discussed above. The advantage of this approach is that it does not require extra work to recover the y-coordinate. A disadvantage, compared to the previous methods above, is that the zR has to be computed separately from $wQ+(zu \mod n) G$ meaning that some of the savings of the joint sum are not achieved.

Figure 12:
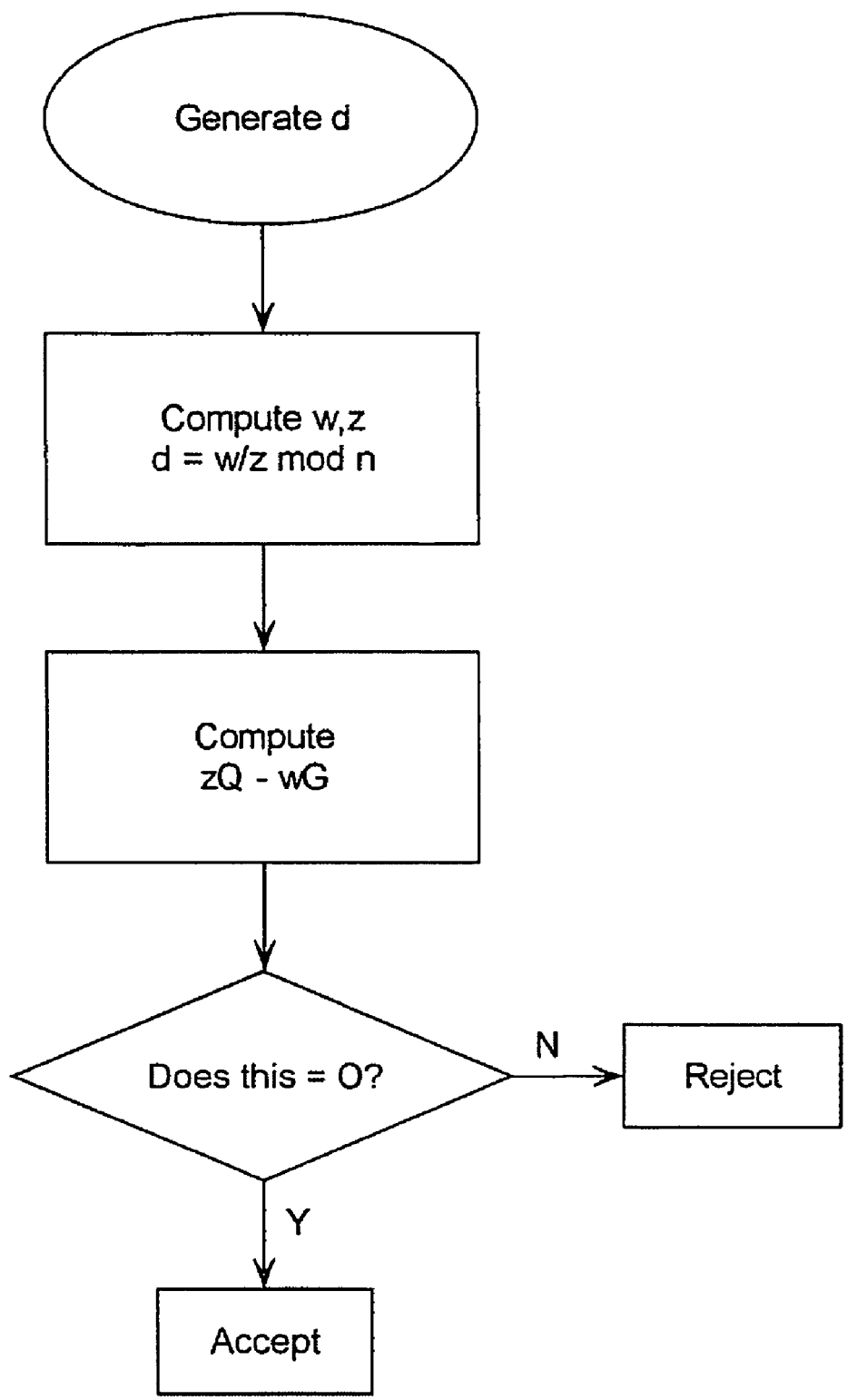
FIG. 12 is a flow chart showing point verification.

The above examples have verified a signature between a pair of correspondents 12, 14. The technique may also be used to verify an elliptic curve key pair (d, Q) as shown in FIG. 12. To verify the key pair means to check that $Q=dG$. This may be important when the key pair is provided by a third party under secure conditions to ensure no tampering has occurred. If t is the bit length of d, then computing dG with the binary method take (3t/2) operations on average. In the present embodiment, one of the correspondents, 12, 14 generates a random integer d and obtains a pair of integers w, z such that $d=w/z \mod n$. Typically the integers w, z are each of half the of length d. Then the correspondent computes $zQ-wG$, and checks that the result is the group identify 0. Computing $zQ-wG$ takes t operations on average so a saving of 50% is obtained. This has the most advantage in environments where storing a pre-computed multiple of G is too expensive. As an alternative where limited memory is available, given a pre-computed multiple $H=uG$, then dG can be computed as $d' G+d'' H$, where $d=d''+d''u \mod n$, with roughly the same cost as above.

Another application is implicit certificate verification. Implicit certificates are pairs (P, I), where P is an elliptic curve point and I is some identity string. An entity Bob obtains an implicit certificate from a CA by sending a request value R which is an elliptic curve point to the CA. The CA returns the implicit certificate (P, I) and in addition a private key reconstruction data value s. Bob can use s to calculate his private key. More generally, any entity can use s to verify that the implicit certificate correctly corresponds to Bob's request value R and the CA public key C. This is done by checking the verification equality $H(P, I)R+sG=H(P,I)P+C$, where H is a hash function. This equation is equivalent to $eQ+sG=C$, where $e=H(P, I)$ and $Q=R-P$. The form of this equation is highly similar to the form of the standard ECDSA verification equation. Consequently, the techniques discussed above may be used to provide a means to accelerate verification of this equation. This is done optimally by determining relatively smaller values w and z such that $e=w/z \mod n$, then multiplying the equation through by z to give: $wQ+(sz \mod n)G-zC=O$. Again, the multiple of G is this equation is full size, but generally multiples of G can be pre-computed, so this does not represent a problem.

Another variant that takes advantage of this technique is to shorten all three multiples in the ECDSA signing equation. Theoretically, each multiple can be shortened to a length which is ⅔ the length of n (where n is the order of G). One way to achieve this shortening is by solving the short vector lattice problem in 3 dimensions. Algorithms exist for solving such problems. Shortening all three multiples is most useful when no pre-computed multiples of G can be stored, which makes it more efficient to reduce the length of the multiple of G as much as possible. Such techniques are described more fully in Henri Cohen, "A Course in Computational Algebraic Number Theory", Springer, ISBN 0-387-55640-0. Sections 2.6 and 2.6 describe the LLL algorithm, its application to finding short vectors in lattices, and also mentions Vallee's special algorithm for 3 dimensional lattices.

Another application of this technique is the application to a modified version of the Pintsov-Vanstone Signature scheme (PVS) with partial message recovery. A PVS signature is of a triple (r, s, t). Verification of a signature and message recovery from a signature under public Q, with base generator G, is done as follows. The verifier computes $e=H(r\|t)$, where H is a hash function. The verifier then computes $R=sG+eQ$. Next, the verifier derives a symmetric encryption key K from R. With this, the verifier decrypts r using K to obtain a recovered message part u. The recovered message is some combination of t and u. The signature is valid only if u contains some redundancy, which is checked by verifying that u conforms to some predetermined format. The PVS scheme is part of draft standards IEEE P1363a and ANSI X9.92.

Figure 13:
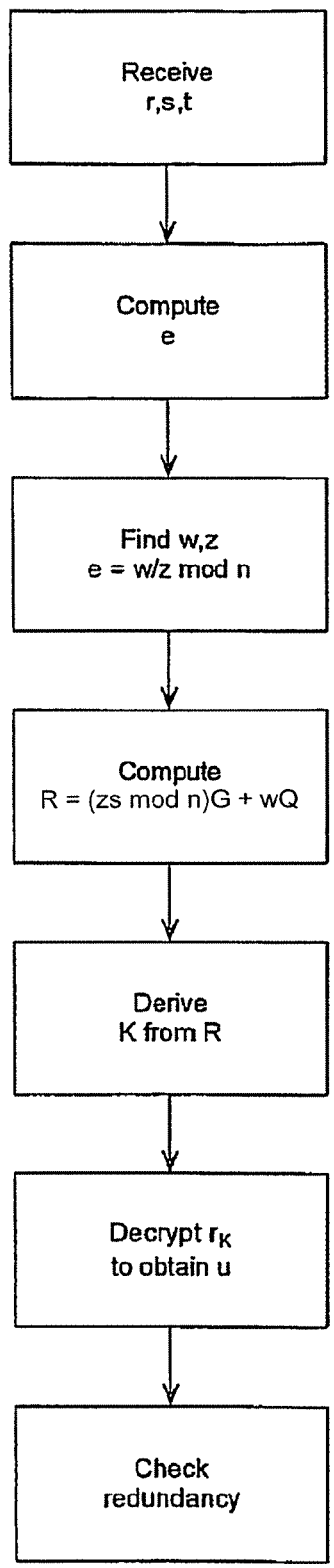
FIG. 13 is a flow chart showing a modified PVS verification protocol.

In a modified variant of PVS, verification time can be decreased by utilizing integers w and z. The modified variant of PVS is shown in FIG. 13 and proceeds as follows. After computing e as usual, the verifier then finds w and z are length half that of n such that $e=w/z \mod n$, where n is the order of the point G. The verifier then computes $R=(zs \mod n)G+wQ$ and proceeds as before, so deriving a key from R and then decrypting r with the key, and then verifying that the decryption has the correct form. This form of verification is more efficient because the multiple of Q is smaller.

A method to further accelerate signature verification of digital signature, in elliptic curve groups and similar groups is illustrated as follows. The verification of an ECDSA signature is essentially equivalent to confirmation that a linear combination, such as $aR+bQ+cG$, of three elliptic curve points, equals the point of infinity. One way to verify this condition is to compute the point $aR+bQ+cG$ and then check if the result is the point O at infinity, which is the identity element of the group as described above. This verification can sometimes be done more quickly than by directly computing the entire sum. For example, if $a=b=c$, then $aR+b \, Q+cG=O$ if and only if the points R, Q and G are collinear. Checking if points are collinear is considerably faster than adding to elliptic curve points. Collinearity can be checked with just two field multiplication, by the equation $(x_R-x_G)(y_Q-y_G)-(x_Q-x_G)(y_R-y_G)=0$. Adding points requires at least two field multiplication, a field squaring and a field inversion, which is generally equivalent to about 8 field multiplication. When $a=b=c$, verification is thus possible in about 18% of the time taken by adding the points. As such, this technique may be used as a preliminary step of the verification process where the likelihood of these conditions existing is present.

Similarly, when $b=c=0$, so that one wishes to verify that $aR=O$, in principle one does not need to compute aR in its entirety. Instead one could evaluate the $a^{th}$ division polynomial at the point R. The division polynomial essentially corresponds to a recursive formula for the denominators of coordinates the point aR, when expressed as rational functions of the coordinates of the point R. It is known that aR=O if and only if the denominator is zero. Furthermore, when b=c=0 and the elliptic curve group is cyclic of prime order n, it is known that aR=O only if a=0 mod n or if R=O. This verification is comparably instantaneous, in that zero elliptic curve point operations are needed. When the cofactor is small, such as h=2 or h=4, point operations can replaced by a few very fast field operations. Thus special cases of verification that a sum points is zero can be done very quickly.

Recursive formula exist, similar to the recursive formulae for division polynomials, for the denominators of sums like aR+bQ+cG, and these can be compute more quickly than the computing the full value of the point aR+bQ+cG. Knowledge of the group order n can further improve verification time.

Figure 14:
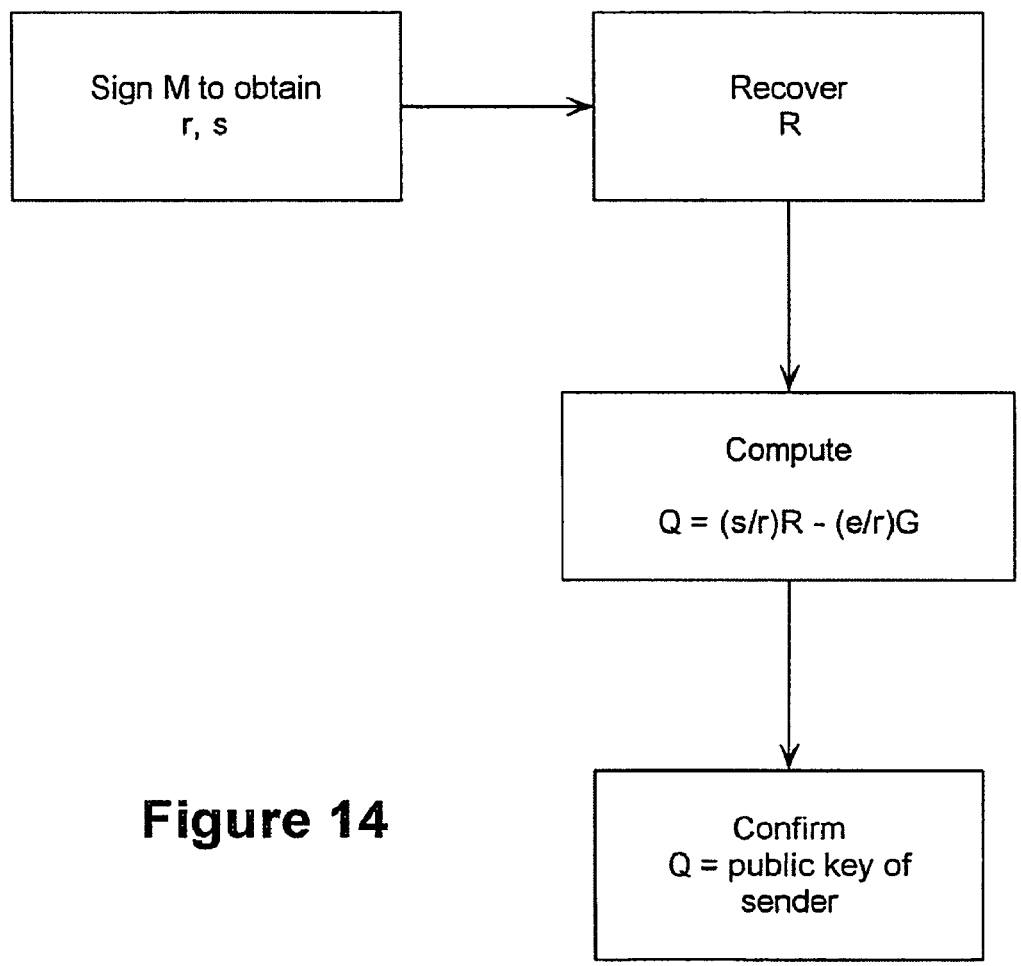
FIG. 14 shows a method of recovering a public key from an ECDSA signature.

Yet another application of this technique is to provide efficient recovery of the public key Q from only the ECDSA digital signature as shown in FIG. 14. Suppose that one correspondent 12 signs a message M with signature (r, s) and wishes to send the signed message to the correspondent 14. Normally correspondent 14 will send M and (r, s) to the correspondent, and will also often send the public key Q. If correspondent 12 did not send her public key, then normally correspondent 14 will look up her public key up in some database, which could stored locally or remotely via some network. To avoid this, it would be beneficial to be able to recover the public key Q from the signature.

Given an ordinary ECDSA signature (r, s), one can recover several candidate points Q that could potentially be the public key. The first step is recover the point R. Several methods have already been described for finding R in the context of accelerated verification, such as: by inclusion of extra information with the signature; by inclusion of extra information in the message signed; by extra work on the signer's part to ensure one valid R can correspond to r; and by extra work on the verifier's part of trying a multiplicity of different R values corresponding to r. Once R is recovered by one of these methods, then the public key Q can be recovered as follows. The standard ECDSA verification equation is R=(e/s)G+(r/s)Q, where e=H(M) is the hash of the message. Given R and this equation, solving for Q is done by Q=(s/r)R−(e/r) G.

However, since with a significant probability a pair (r, s) will yield some valid public key, the correspondent 14 needs a way to check that Q is correspondent's 12 public key. Correspondent 12 can make available to correspondent 14 the signature, such as another ECDSA signature (r', s'), from a CA on correspondent 14 public key. Correspondent 12 can send the CA signature, (r', s'), to correspondent 14, or correspondent 14 can look it up in some database. The CA's signature will be on correspondent's 12 name and her public key Q. Correspondent 14 will use the CA's certificate to verify the message which corresponds to the public key Q. If the signature verifies then the correspondent 14 has recovered the correct value for the public key Q. Omitting the public key from the certificate can save on bandwidth and storage and the verification process described above yields reduced verification times.

Correspondent 14 could also verify that Q is correspondent's 12 public key by checking Q against some more compact value derived from Q, such as the half of the bits of Q. The compact version of Q could then stored or communicated instead of Q, again savings on storage and bandwidth.

H will also be appreciated that each of the values used in the verification equality are public values. Accordingly, where limited computing power is available at the verifier it is possible for the signer to compute the values of w and z and forward them with R as part of the message. The recipient then does not need to recover R or compute w and z but can perform the verification with the information available. The verification is accelerated but the bandwidth increased.

Although the descriptions above were for elliptic curve groups, many of the methods described in the present invention applies more generally to any group used in cryptography, and furthermore to any other application that uses exponentiation of group elements. For example, the present invention may be used when the group is a genus 2 hyperelliptic curve, which have recently been proposed as an alternative to elliptic curve groups. The above techniques may also be used to accelerate the verification of the Digital Signature Algorithm (DSA), which is an analogue of the ECDSA. Like ECDSA, a DSA signature consists of a pair of integers (r, s), and r is obtained from an element R of the DSA group. The DSA group is defined to be a subgroup of the multiplicative group of finite field. Unlike ECDSA, however, recovery of R from r is not easy to achieve, even with the help of a few additional bits. Therefore, the present technique applies most easily to DSA if the value is R sent with as part of the signed message, or as additional part of the signature, or as a replacement for the value r. Typically, the integer r is represented with 20 bytes, but the value R is represented with 128 bytes. As a result, the combined signature and message length is about 108 bytes longer. This could be a small price to pay to accelerate verification by 33%, however.

In the DSA setup, p is a large prime, and q is smaller prime and q is a divisor of (p−1). An integer g is chosen such that $g^q=1 \mod p$, and $1<g<p$. (Note that q and g correspond to n and G, respectively, from ECDSA.)

The private key of the signer is some integer x and the public key is $Y=g^x \mod p$.

The signer generates a signature in the form (R,s) instead of the usual (r, s). Here, $R=g^k \mod p$, whereas, $r=R \mod q$. In both cases, $s=k^{-1}(h(M)+x r) \mod q$, where x is the private key of the signer, M is the message being signed, and h is the hash function being used to digest the message (as in ECDSA).

In normal DSA, the verifier verifies signature (r, s) by computing $u=h(M)/s \mod q$ and $v=r/s \mod q$, much like the u and v in ECDSA embodiments, and then checks that $r=(g^u Y^v \mod p) \mod q$.

In this embodiment, the verifier finds w and z of bit length about half that of q, so that each of w and z is approximately sqrt(q), such that $v=w/z \mod q$. This is done by the same method as in ECDSA embodiment above, with n replaced by q. The verifier then computes:

$$R^z g^{(zu \mod q)} Y^w \mod p.$$

If this quantity equals 1, then verifier accepts the signature, otherwise the signature is rejected.

The verifier computes this quantity using the square-and-multiply algorithm, or some variants thereof, and exploits simultaneous squaring, which is analogous to simultaneous doubling in ECDSA. Many of the methods of ECDSA fast verify may be used for DSA fast verify. A pre-computed multiple of the g, say j, may be used, so that the computation looks like: $R^z g^S j^t Y^W \mod p$ where each of z, s, t and w has bit length about half that of q. If pre-computed powers of the public Y are made available, then the lengths of the exponents can be further reduced, thereby further reducing the number of doublings, making the verification yet faster.

What is claimed is:

1. In a cryptographic module having an arithmetic processing unit, a method of verifying a relationship between a sum of scalar multiples of a pair of points on an elliptic curve and a third point on said curve, the sum of scalar multiples of said pair of points including a first scalar multiplied by a first point of said pair of points added to a second scalar multiplied by a second point of said pair of points, the method comprising:

the cryptographic module obtaining a pair of integers, each of the pair of integers having a bit length less than the bit length of one of said first scalar and said second scalar and wherein the ratio of the pair of integers corresponds to said one of said first scalar and said second scalar, the arithmetic processing unit performing computations from which said relationship can be verified, said computations involving said first point, said second point, said third point, and said pair of integers, wherein said integers are used in said computations instead of said one of said first scalar and said second scalar, thereby reducing the number of said computations, subsequent to said computations, the cryptographic module determining whether the result of said computations indicates verification of said relationship, and if the result of said computations indicates the verification of said relationship, producing an output indicative of the verification.

2. The method according to claim 1 wherein said computations include multiplying one of said pair of integers by one of said pair of points.

3. The method according to claim 2 wherein said computations include multiplying another of said pair of integers by said third point.

4. The method according to claim 3 wherein a scalar multiple of another of said pair of points is separated into two points, one of which has a predetermined value.

5. The method according to claim 4 wherein said one of said two points is pre-computed and stored for repeated use.

6. The method according to claim 3 wherein said integers have equal bit length.

7. The method according to claim 3 wherein said integers have different bit lengths.

8. The method according to claim 3 wherein said computations include performing simultaneous addition on at least two points.

9. The method according to claim 8 wherein computation of the addition of said two points is performed using a simultaneous double and add algorithm.

10. The method according to claim 3 wherein one of said pair of points represents a fixed parameter of a cryptographic system.

11. The method according to claim 10 wherein at least a portion of a scalar multiple of said point representing said fixed parameter is precomputed.

12. The method according to claim 11 wherein said scalar multiple of said point representing said fixed parameter is split into two points and one of said two points is precomputed.

13. The method according to claim 3 wherein said computations include summing scalar multiples of points, and wherein said determining whether the result of said computations indicates verification of said relationship includes comparing the result of said computations to a group identity.

14. The method according to claim 1 wherein said integers are obtained using an iterative algorithm that is interrupted when integers of required bit length are obtained.

15. The method according to claim 14 wherein said algorithm is an extended Euclidean algorithm.

16. A method of verifying a digital signature of a message, said digital signature having been generated from said message by performing cryptographic operations in a group having elements represented by bit strings, said signature comprising a first signature component and a second signature component, the first signature component having been derived from an ephemeral public key of a signer and the second signature component having been derived from said message, said first signature component, an ephemeral private key of said signer, and a long term private key of said signer, said method comprising:

obtaining said ephemeral public key from said first signature component;

computing at least one of a pair of scalars, a first of which is computed using said message and said second signature component, and a second of which is computed using said first signature component and said second signature component;

obtaining a pair of integers, each of the pair of integers having a bit length less than the bit length of one of said scalars and wherein the ratio of the pair of integers corresponds to said one of said scalars;

performing computations from which said digital signature can be verified, said computations involving said ephemeral public key, a long term public key of the signer, and a generator of said group, wherein said pair of integers is used in said computations instead of said one of said scalars, thereby reducing the number of said computations determining whether the result of said computations indicates verification of said digital signature; and accepting said digital signature only if the result of said computation indicates the verification of said digital signature.

17. The method according to claim 16 wherein said computations involve repeated application of a group operation on said ephemeral public key.

18. The method according to claim 17 wherein said computations include performing group operations on said ephemeral public key and said long term public key that involve operands of reduced bit length.

19. The method according to claim 16 wherein said group is an elliptic curve group and said computations include performing a sum of scalar multiples of points on said curve.

20. The method according to claim 19 wherein the result of said computations is of the form $-zR+(zu \bmod n)G+wQ$ where R is the ephemeral public key;
G is the generator of the group;
Q is the long term public key of the signer;
n is the order of the group;
z, w are said integers
u is said first of said scalars; and
o is the group identity.

21. The method according to claim 20 wherein said first signature component r=x' is an integer derived from the ephemeral public key kG where k is an ephemeral private key, and wherein said second signature component is of the form $s=k^{-1}(H(M)+dr) \bmod n$ where n is an order of a generator point, H(M) is a secure hash of said message, and d is the long term private key of said signer, and wherein said first of said scalars u corresponds to H(M)/s mod n.

22. The method according to claim 21 wherein said first signature component r and said second signature component s satisfy the relationship uG+vQ=R where v=r/s mod n and u=H(M)/s mod n, and wherein v=w/z mod n where w and z are said integers.

23. The method according to claim 20 wherein precomputed multiples of said generator G are utilised during said computations.

24. The method according to claim 23 wherein simultaneous double and add operations are performed during said computations.

25. The method according to claim 23 wherein a point derived from said generator is split into a pair of points and one of said pair of points is precomputed.

26. The method according to claim 23 wherein a table of values of $2^iG$ is computed and values from said table used in said performing said computations.

27. The method according to claim 19 wherein said pair of integers are obtained by application of an iterative algorithm that is interrupted when bit lengths of said pairs of integers are at a predetermined value.

28. The method according to claim 27 wherein said predetermined value is when said bit lengths are equal.

29. The method according to claim 16 wherein said group is an elliptic curve group, and said determining whether the result of said computations indicates verification of said digital signature includes checking for co-linearity of points on said curve.

30. The method according to claim 19 wherein said signature includes an indicator to identify one of a plurality of possible values of said ephemeral public key.

31. A cryptographic module having an arithmetic processing unit, the cryptographic module operable to perform operations for verifying a relationship between a sum of scalar multiples of a pair of points on an elliptic curve and a third point on said curve, the sum of scalar multiples of said pair of points including a first scalar multiplied by a first point of said pair of points added to a second scalar multiplied by a second point of said pair of points, said operations comprising:

obtaining a pair of integers, each of the pair of integers having a bit length less than the bit length of one of said first scalar and said second scalar and wherein the ratio of the pair of integers corresponds to said one of said first scalar and said second scalar, performing computations from which said relationship can be verified, said computations involving said first point, said second point, said third point, and said pair of integers, wherein said integers are used in said computations instead of said one of said first scalar and said second scalar, thereby reducing the number of said computations, subsequent to said computations, determining whether the result of said computations indicates verification of said relationship, and if the result of said computations indicates the verification of said relationship, producing an output indicative of the verification.

32. A cryptographic module operable to perform operations for verifying a digital signature of a message, said digital signature having been generated from said message by performing cryptographic operations in a group having elements represented by bit strings, said signature comprising a first signature component and a second signature component, the first signature component having been derived from an ephemeral public key of a signer and the second signature component having been derived from said message, said first signature component, an ephemeral private key of said signer, and a long term private key of said signer, said operations comprising:

obtaining said ephemeral public key from said first signature component;

computing at least one of a pair of scalars, a first of which is computed using said message and said second signature component, and a second of which is computed using said first signature component and said second signature component;

obtaining a pair of integers, each of the pair of integers having a bit length less than the bit length of one of said scalars and wherein the ratio of the pair of integers corresponds to said one of said scalars;

performing computations from which said digital signature can be verified said computations involving said ephemeral public key, a long term public key of the signer, and a generator of said group, wherein said pair of integers is used in said computations instead of said one of said scalars, thereby reducing the number of said computations determining whether the result of said computations indicates verification of said digital signature; and accepting said digital signature only if the result of said computation indicates the verification of said digital signature.

* * * * *

UNITED STATES PATENT AND TRADEMARK OFFICE
CERTIFICATE OF CORRECTION

PATENT NO. : 8,204,232 B2  
APPLICATION NO. : 11/333296  
DATED : June 19, 2012  
INVENTOR(S) : Marinus Struik Page 1 of 1

It is certified that error appears in the above-identified patent and that said Letters Patent is hereby corrected as shown below:

IN THE CLAIMS:

Column 18, Line 48, in Claim 20, delete "o" and insert -- O --, therefor.

Column 20, Line 31, in Claim 32, delete "verified" and insert -- verified, --, therefor.

Signed and Sealed this
Twenty-sixth Day of February, 2013

Teresa Stanek Rea
*Acting Director of the United States Patent and Trademark Office*